(12) United States Patent
Samanta et al.

(10) Patent No.: US 12,043,705 B2
(45) Date of Patent: Jul. 23, 2024

(54) PIGMENT DISPERSANT FOR COATING

(71) Applicant: BASF Coatings GmbH, Münster (DE)

(72) Inventors: Shampa R. Samanta, Southfield, MI (US); Chintankumar Patel, Ludwigshafen (DE); Qingling Zhang, Southfield, MI (US); Karel Hartlieb, Southfield, MI (US); Benjamin Georg Robert Mohr, Ludwigshafen (DE)

(73) Assignee: BASF COATINGS GMBH, Muenster (DE)

( * ) Notice: Subject to any disclaimer, the term of this patent is extended or adjusted under 35 U.S.C. 154(b) by 667 days.

(21) Appl. No.: 17/270,639

(22) PCT Filed: Aug. 9, 2019

(86) PCT No.: PCT/EP2019/071413
§ 371 (c)(1),
(2) Date: Feb. 23, 2021

(87) PCT Pub. No.: WO2020/043462
PCT Pub. Date: Mar. 5, 2020

(65) Prior Publication Data
US 2021/0332194 A1    Oct. 28, 2021

(30) Foreign Application Priority Data

Aug. 27, 2018 (EP) .................... 18190929

(51) Int. Cl.
| | | |
|---|---|---|
| C08G 81/02 | (2006.01) | |
| C09B 67/00 | (2006.01) | |
| C09B 67/46 | (2006.01) | |
| C09D 7/45 | (2018.01) | |
| C09D 7/65 | (2018.01) | |
| C09D 11/037 | (2014.01) | |
| C09D 17/00 | (2006.01) | |

(52) U.S. Cl.
CPC ......... *C08G 81/027* (2013.01); *C08G 81/025* (2013.01); *C09B 67/009* (2013.01); *C09D 7/45* (2018.01); *C09D 7/65* (2018.01); *C09D 11/037* (2013.01); *C09D 17/003* (2013.01)

(58) Field of Classification Search
CPC ...... C08G 81/027; C08G 81/025; C09D 7/65; C09D 7/45; C09D 11/037; C09D 17/003; C09B 67/009

USPC .......................................................... 524/539
See application file for complete search history.

(56) References Cited

U.S. PATENT DOCUMENTS

| | | | |
|---|---|---|---|
| 4,086,182 A * | 4/1978 | Hengelhaupt | C09D 183/00 106/14.13 |
| 5,763,548 A | 6/1998 | Matyjaszewski et al. | |
| 5,789,487 A | 8/1998 | Matyjaszewski et al. | |
| 5,807,937 A | 9/1998 | Matyjaszewski et al. | |
| 6,037,414 A | 3/2000 | Simms et al. | |
| 6,365,666 B1 | 4/2002 | Mccollum et al. | |
| 6,451,950 B1 * | 9/2002 | Ma | C09D 5/02 526/321 |
| 6,642,301 B2 | 11/2003 | White et al. | |
| 8,129,466 B2 | 3/2012 | Polk et al. | |
| 8,901,231 B2 | 12/2014 | Brand et al. | |
| 2008/0188610 A1 * | 8/2008 | Polk | C09D 7/45 524/539 |
| 2015/0159030 A1 * | 6/2015 | Decker | C08L 33/14 252/511 |
| 2015/0266980 A1 * | 9/2015 | Martinez-Castro | C07C 69/54 526/313 |
| 2016/0246200 A1 | 8/2016 | Toyoda et al. | |
| 2016/0257774 A1 | 9/2016 | Shooter et al. | |

FOREIGN PATENT DOCUMENTS

| | | |
|---|---|---|
| CN | 108129587 A | 6/2018 |
| JP | 2013514394 A | 4/2013 |
| JP | 2017226753 A | 12/2017 |
| WO | 9840415 A1 | 9/1998 |
| WO | 2016098578 A1 | 6/2016 |

OTHER PUBLICATIONS

European Search Report for EP Patent Application No. 18190929.2, Issued on Mar. 15, 2019, 4 pages.
International Search Report and Written Opinion for corresponding PCT/EP2019/071413 mailed Oct. 7, 2019, 11 Pages.

\* cited by examiner

*Primary Examiner* — Ling Siu Cho
*Assistant Examiner* — Ronald Grinsted
(74) *Attorney, Agent, or Firm* — Armstrong Teasdale LLP

(57) ABSTRACT

Described herein is a polymeric pigment dispersant, a process for preparation of the polymeric pigment dispersant and a pigment dispersion including the pigment dispersant that is used for coating and in printing ink, automotive basecoat, auto-motive clearcoat, mill base, furniture coatings and wood coatings.

13 Claims, No Drawings

PIGMENT DISPERSANT FOR COATING

CROSS-REFERENCE TO RELATED APPLICATIONS

This application is a U.S. National Phase Application of International Patent Application No. PCT/EP2019/071413, filed Aug. 9, 2019, which claims the benefit of priority to European Patent Application No. 18190929.2, filed Aug. 27, 2018, the entire contents of which are hereby incorporated by reference herein.

TECHNICAL FIELD

The presently claimed invention relates to a polymeric pigment dispersant, a process for preparation of the polymeric pigment dispersant and a pigment dispersion comprising the pigment dispersant that is used for coating and in printing ink, automotive basecoat, automotive clearcoat, mill base, furniture coatings and wood coatings. The presently claimed invention further relates to a coating composition comprising the pigment dispersion.

BACKGROUND

Pigmented coating compositions are widely used as corrosion resistant primers and decorative topcoats in automotive industry. The automotive market is trending toward high transparency colour and rich chroma as colour is a major factor in the vehicle-commercialization segment of the automotive industry. The high transparency and the rich chroma is generally achieved by very stable fine dispersion of organic pigment to the submicron size in the clearcoat. But the agglomeration of the pigment particles of small size, i.e., below 100 nm, during their application in coating and in long term storage in the coating composition is a major challenge in the coating industry. It is desirable that the pigment dispersions remain substantially stable with minimal pigment stalling and viscosity change.

Traditionally, the monomers with the anchor functionality used in pigment dispersion compositions must be pre-synthesized which is a cumbersome method. Monomers synthesis by the traditional methods may result in unwanted polymerization of precursors which makes it undesirable. Further, the dispersants prepared with the monomers that are pre-synthesized have several limitations such as a specific set up and the rigorous conditions for their synthesis as well as being less reactive due to the large steric effects. Therefore, there is a need for continued development of pigment dispersants and dispersions by novel methods to address the problems of the existing pigment dispersion compositions.

In the state of the art, pigment dispersants comprising pre-synthesized monomers that form the anchoring block or anchors are known and described, for instance, in the following references.

U.S. 2016/0246200 A1 describes a pigment dispersion composition comprising a pigment, a non-water-soluble solvent, a compound in which a specific azo skeleton structure is bonded to a specific polymer having a monomer unit, and a polymer compound having a monomer unit that are synthesized.

U.S. 2016/257774 A1 describes a polymeric dispersant composition comprising an acrylic backbone with at least one pendantly attached imide group, wherein the carbonyl of the imide is chemically bonded to a fused aromatic ring.

U.S. Pat. No. 6,037,414 A describes a polymeric pigment dispersant comprising a graft polymer having an acrylic backbone, polyester side chains, cyclic imide groups and quaternary ammonium groups.

U.S. Pat. No. 8,129,466 B2 describes a nanoparticle dispersion comprising a dispersant comprising a tri-block polymer having a first block comprising a glycidyl(meth)acrylate reacted with a naphthoic acid, a second block comprising (meth)acrylic acid alkyl esters, and a third block comprising (meth)acrylic acid alkyl esters, wherein said third block is different from said second block.

WO 2016/098578 A1 describes a composition of a pigment dispersed resin characterized by containing a polycyclic aromatic hydrocarbon containing monomer at a quantity of 1-70 mass percent relative to the total quantity of solid content.

JP 2017/226753 A describes a pigment dispersion paste containing a pigment dispersion resin containing 1-70 mass percent of a polymerizable unsaturated monomer having a naphthyl group or a derivative thereof.

The methods and compositions disclosed in the prior art have limitations. The compositions and methods disclosed in the prior art described above do not provide efficient pigment dispersants that have strong interaction with the pigment particles to achieve a fine dispersion of the pigment particles to the submicron size. The absence of a strong interaction with the pigment particles affects the transparency and colour which is desired in the market. Still further, the prior art described above discloses the pre-synthesis of the monomers that form the anchoring block of the pigment dispersant and has the limitations of purification of the monomers and need for rigorous conditions.

Hence, it is an object of the presently claimed invention to provide a polymeric pigment dispersant having a well-defined polymer chain architecture that provides an efficient dispersion of the pigment particles as evidenced by the lower lightness (determined by measurement of L* value) of the coating resulting from the pigment dispersion containing the polymeric pigment dispersant which can easily be synthesized under mild conditions.

A further object of the presently claimed invention is to provide an efficient process to prepare the polymeric pigment dispersant.

SUMMARY

Surprisingly, it was found that coating compositions comprising a polymeric pigment dispersant as described hereinbelow provides excellent stabilization to the pigment particles as evidenced by the lower lightness (determined by measurement of L* value) of the coating that results from the coating composition comprising the novel polymeric pigment dispersant. Further, it was unexpectedly found that the process of preparation of the polymeric pigment dispersant as described hereinbelow is more efficient and less expensive than the traditionally known methods that include pre-synthesis of the anchors.

Accordingly, in one aspect, the presently claimed invention is directed to a polymeric pigment dispersant comprising a polymer backbone (P) and at least one moiety of the formula (I):

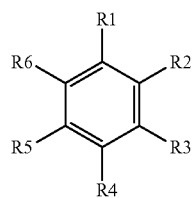

wherein
- R1 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;
- R2 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;
- R3 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;
- R4 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;
- R5 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;
- R6 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH; or
- R5 and R6 together with the carbon atoms to which they are bonded form an unsubstituted phenyl or substituted phenyl which is substituted with at least one —OH; PS whereby the at least one phenyl in each case may be substituted further with 1, 2 or 3 substituents independently selected from the group consisting of F, Cl, Br, I, —$NO_2$, —CN, —$C_1$-$C_6$-alkyl, —$CHF_2$, —$CH_2F$, —$CF_3$, cyclopropyl, —O—$C_1$-$C_6$-alkyl, —C(=O)—$C_1$-$C_6$-alkyl, —C(=O)—O—$C_1$-$C_6$-alkyl, —C(=O)—O— phenyl and —$CH_2$—C(=O)—$C_1$-$C_6$-alkyl;

whereby at least two of R1, R2, R3, R4, R5 and R6 are —OH or comprise —OH and one of R1, R2, R3, R4, R5 and R6 is a —C(=O)—O— group or comprises a —C(=O)—O— group; and whereby the moiety of formula (I) is bonded to the polymer backbone via a —C(=O)—O— group.

In another aspect, the presently claimed invention is directed to a process for the preparation of at least one polymeric pigment dispersant comprising at least the steps of:

reacting a linear di-block polymer with a compound of the formula (II):

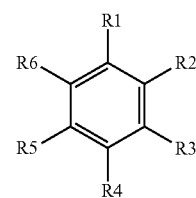

wherein
- R1 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R2 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R3 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R4 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R5 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R6 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH; or R5 and R6 together with the carbon atoms to which they are bonded form an unsubstituted phenyl or substituted phenyl which is substituted with at least one —OH;

whereby the at least one phenyl in each case may be substituted further with 1, 2 or 3 substituents independently selected from the group consisting of F, Cl, Br, I, —NO$_2$, —CN, —C$_1$-C$_6$-alkyl, —CHF$_2$, —CH$_2$F, —CF$_3$, cyclopropyl, —O—C$_1$-C$_6$-alkyl, —C(=O)—C$_1$-C$_6$-alkyl, —C(=O)—O—C$_1$-C$_6$-alkyl, —C(=O)—O— phenyl and —CH$_2$—C(=O)—C$_1$-C$_6$-alkyl;

whereby at least two of R1, R2, R3, R4, R5 and R6 are —OH or comprise —OH and one of R1, R2, R3, R4, R5 and R6 is a —C(=O)—OH or comprises a —C(=O)—OH; at a temperature in the range from ≥80° C. to ≤150° C.; and wherein the linear di-block copolymer comprises a first and a second block and is obtained by a living free radical polymerization, optionally in the presence of a solvent.

In yet another aspect, the presently claimed invention is directed to a process for the preparation of at least one polymeric pigment dispersant comprising at least the steps of:

(a) reacting a random polymer with a compound of the formula (II):

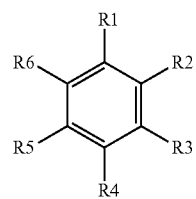

(II)

wherein

R1 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH;

R2 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH;

R3 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH;

R4 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH;

R5 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH;

R6 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH; or R5 and R6 together with the carbon atoms to which they are bonded form an unsubstituted phenyl or substituted phenyl which is substituted with at least one —OH;

whereby the at least one phenyl in each case may be substituted further with 1, 2 or 3 substituents independently selected from the group consisting of F, Cl, Br, I, —NO$_2$, —CN, —C$_1$-C$_6$-alkyl, —CHF$_2$, —CH$_2$F, —CF$_3$, cyclopropyl, —O—C$_1$-C$_6$-alkyl, —C(=O)—C$_1$-C$_6$-alkyl, —C(=O)—O—C$_1$-C$_6$-alkyl, —C(=O)—O— phenyl and —CH$_2$—C(=O)—C$_1$-C$_6$-alkyl;

whereby at least two of R1, R2, R3, R4, R5 and R6 are —OH or comprise —OH and one of R1, R2, R3, R4, R5 and R6 is a —C(=O)—OH or comprises a —C(=O)—OH; and (b) reacting the compound obtained in step (a) with at least one monomer of a lactone at a temperature in the range from ≥100° C. to ≤140° C.

In another aspect, the presently claimed invention is directed to a process for the preparation of at least one polymeric pigment dispersant comprising at least the steps of:

(a) reacting at least one polyalkylene glycol monoalkyl ether and at least one carboxylic acid anhydride at a temperature in the range from ≥100° C. to ≤140° C. to obtain a mixture; and (b) reacting the mixture obtained in step (a) with a random polymer and a compound of the formula (II):

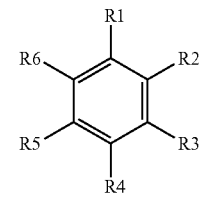

(II)

wherein

R1 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH;

R2 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH;

R3 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH;

R4 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;

R5 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;

R6 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH; or R5 and R6 together with the carbon atoms to which they are bonded form an unsubstituted phenyl or substituted phenyl which is substituted with at least one —OH;

whereby at least two of R1, R2, R3, R4, R5 and R6 are —OH or comprise —OH and one of R1, R2, R3, R4, R5 and R6 is a —C(=O)—OH or comprises a —C(=O)—OH;

whereby the at least one phenyl in each case may be substituted further with 1, 2 or 3 substituents independently selected from the group consisting of F, Cl, Br, I, —NO$_2$, —CN, —C$_1$-C$_6$-alkyl, —CHF$_2$, —CH$_2$F, —CF$_3$, cyclopropyl, —O—C$_1$-C$_6$-alkyl, —C(=O)—C$_1$-C$_6$-alkyl, —C(=O)—O—C$_1$-C$_6$-alkyl, —C(=O)—O— phenyl and —CH$_2$—C(=O)—C$_1$-C$_6$-alkyl;

at a temperature in the range from ≥100° C. to ≤140° C.

In another aspect, the presently claimed invention is directed to a pigment dispersion comprising at least one polymeric pigment dispersant according to the presently claimed invention, at least one solvent and at least one pigment.

In another aspect, the presently claimed invention is directed to a coating composition comprising the pigment dispersion according to the presently claimed invention and at least one binder.

In another aspect, the presently claimed invention is directed to a use of the pigment dispersion according to the presently claimed invention in printing ink, automotive basecoat, automotive clearcoat, mill base, furniture coatings and wood coatings.

In yet another aspect, the presently claimed invention is directed to an article coated with at least one layer formed from the coating composition according to the presently claimed invention.

The presently claimed invention is associated with at least one of the following advantages:
(i) the polymeric pigment dispersants are synthesized with di-block and random polymer architecture using conventional polymerization technique,
(ii) the pigment dispersion with pigment particles of submicron particle size of less than 100 nm are provided,
(iii) the compound of formula (II) as described hereinbelow and hereinabove provides good interaction and strong adsorption with a pigment surface,
(iv) the polymer backbone of the presently claimed invention provides steric stabilization, and
(v) the polymeric pigment dispersants of the presently claimed invention provides high chroma and transparent colour in comparison to traditional hyperdispersants or pigment dispersants.

Other objects, advantages and applications of the presently claimed invention will become apparent to those skilled in the art from the following detailed description.

DETAILED DESCRIPTION

The following detailed description is merely exemplary in nature and is not intended to limit the presently claimed invention or the application and uses of the presently claimed invention. Furthermore, there is no intention to be bound by any theory presented in the preceding technical field, background, summary or the following detailed description.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the subject matter described herein are capable of operation in other sequences than described or illustrated herein. In case the terms "(A)", "(B)" and "(C)" or "(a)", "(b)", "(c)", "(d)", "(i)", "(ii)" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the subject matter are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a feature, structure or characteristic described in connection with the embodiment is included in at least one embodiment of the presently claimed invention. Thus, appearances of the phrases "in one embodiment" or "in an embodiment" in various places throughout this specification are not necessarily all referring to the same embodiment but may. Furthermore, the features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the subject matter, and form different embodiments, as would be understood by those in the art. For example, in the appended claims, any of the claimed embodiments can be used in any combination.

Furthermore, the ranges defined throughout the specification include the end values as well, i.e. a range of 1 to 10 implies that both 1 and 10 are included in the range. For the avoidance of doubt, the applicant shall be entitled to any equivalents according to applicable law.

For the purposes of the presently claimed invention, a block polymer or a block copolymer is defined as a polymer or a copolymer formed when two or more monomers cluster together and form 'blocks' of repeating units.

For the purposes of the presently claimed invention, a random polymer or a random copolymer is defined as a polymer or a copolymer formed when two or more monomers are added as repeating units in a completely random manner.

For the purposes of the presently claimed invention, a graft polymer is a segmented copolymer with a linear backbone of one composite and randomly distributed branches of another composite.

Reference throughout this specification to the term "copolymer" means that the copolymer comprises block or random copolymers obtainable by radical polymerization.

For the purposes of the presently claimed invention, the mass-average ($M_w$) and number-average ($M_n$) molecular weight is determined by means of gel permeation chromatography at 40° C., using a high-performance liquid chromatography pump and a refractive index detector. The eluent used was tetrahydrofuran with an elution rate of 1 ml/min. The calibration is carried out by means of polystyrene standards.

For the purposes of the presently claimed invention, the boiling point indicates the temperature at which the vapor pressure of a liquid equals the external pressure surrounding the liquid. For the purposes of the presently claimed invention, the boiling point is determined in accordance with ASTM D5399.

For the purposes of the presently claimed subject matter, a polar solvent is defined to be a solvent with large dipole moments and which contains bonds between atoms with very different electronegativities.

For the purposes of the presently claimed invention, a dielectric constant value of a solvent indicates a measure of polarity of the solvent. Higher dielectric constant of a solvent is indicative of more polarity of the solvent.

For the purposes of the presently claimed invention, a use of (meth) in a monomer or repeat unit indicates an optional methyl group.

For the purposes of the presently claimed invention, a pigment is defined to be any substance that alters the colour of a material through selective absorption or any substance that scatters and reflects light.

For the purposes of the presently claimed invention, effect pigments are defined as flake or platy structures that impart a directional light reflectance, scattering, absorption, or optically variable appearance to the substrate in or on which they are applied.

For the purposes of the presently claimed invention, polydispersity or polydispersity index (PDI) is defined to be a measure of the distribution of molecular mass in a given polymer.

For the purposes of the presently claimed invention, '% by weight' or 'wt. %' as used in the presently claimed invention is with respect to the total weight of the coating composition. Further, sum of wt.-% of all the compounds, as described hereinbelow, in the respective component adds up to 100 wt.-%.

The above-mentioned measurement techniques are well known to a person skilled in the art and therefore do not limit the presently claimed invention.

Polymeric Pigment Dispersant

An aspect of the presently claimed invention is directed to a polymeric pigment dispersant comprising a polymer backbone (P) and at least one moiety of the formula (I):

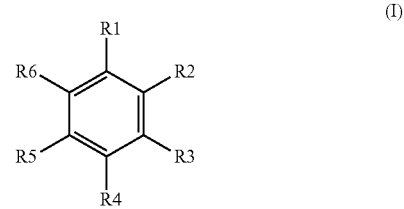

wherein

R1 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R2 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R3 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R4 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R5 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R6 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH; or R5 and R6 together with the carbon atoms to which they are bonded form an unsubstituted phenyl or substituted phenyl which is substituted with at least one —OH;

whereby the at least one phenyl in each case may be substituted further with 1, 2 or 3 substituents independently selected from the group consisting of F, Cl, Br, I, —NO$_2$, —CN, —$C_1$-$C_6$-alkyl, —CHF$_2$, —CH$_2$F, —CF$_3$, cyclopropyl, —O—$C_1$-$C_6$-alkyl, —C(=O)—$C_1$-$C_6$-alkyl, —C(═O)—O—C$_1$-C$_6$-alkyl, —C(═O)—O— phenyl and —CH$_2$—C(═O)—C$_1$-C$_6$-alkyl;

whereby at least two of R1, R2, R3, R4, R5 and R6 are —OH or comprise —OH and one of R1, R2, R3, R4, R5 and R6 is a —C(═O)—O— group or comprises a —C(═O)—O— group; and whereby the moiety of formula (I) is bonded to the polymer backbone via a —C(═O)—O— group.

In an embodiment of the presently claimed invention, R1 is selected from the group consisting of H, —OH, a —C(═O)—O— group, a linear or a branched, substituted C$_1$-C$_8$ alkyl and a linear or branched, substituted C$_2$-C$_8$ alkenyl, whereby the alkyl and the alkenyl are each substituted with one —C(═O)—O— group and at least one phenyl which is substituted with at least one —OH; R2 is selected from the group consisting of H, —OH, a —C(═O)—O— group, a linear or a branched, substituted C$_1$-C$_8$ alkyl and a linear or branched, substituted C$_2$-C$_8$ alkenyl, whereby the alkyl and the alkenyl are each substituted with one —C(═O)—O— group and at least one phenyl which is substituted with at least one —OH; R3 is selected from the group consisting of H, —OH, a —C(═O)—O— group, a linear or a branched, substituted C$_1$-C$_8$ alkyl and a linear or branched, substituted C$_2$-C$_8$ alkenyl, whereby the alkyl and the alkenyl are each substituted with one —C(═O)—O— group and at least one phenyl which is substituted with at least one —OH; R4 is selected from the group consisting of H, —OH, a —C(═O)—O— group, a linear or a branched, substituted C$_1$-C$_8$ alkyl and a linear or branched, substituted C$_2$-C$_8$ alkenyl, whereby the alkyl and the alkenyl are each substituted with one —C(═O)—O— group and at least one phenyl which is substituted with at least one —OH; R5 is selected from the group consisting of H, —OH, a —C(═O)—O— group, a linear or a branched, substituted C$_1$-C$_8$ alkyl and a linear or branched, substituted C$_2$-C$_8$ alkenyl, whereby the alkyl and the alkenyl are each substituted with one —C(═O)—O— group and at least one phenyl which is substituted with at least one —OH; R6 is selected from the group consisting of H, —OH, a —C(═O)—O— group, a linear or a branched, substituted C$_1$-C$_8$ alkyl and a linear or branched, substituted C$_2$-C$_8$ alkenyl, whereby the alkyl and the alkenyl are each substituted with one —C(═O)—O— group and at least one phenyl which is substituted with at least one —OH; or the R5 and R6 together with the carbon atoms to which they are bonded form an unsubstituted phenyl or substituted phenyl which is substituted with at least one —OH; whereby at least two of R1, R2, R3, R4, R5 and R6 are —OH or comprise —OH and one of R1, R2, R3, R4, R5 and R6 is a —C(═O)—O— group or comprises a —C(═O)—O— group; and whereby the moiety of formula (I) is bonded to the polymer backbone via a —C(═O)—O— group.

In an embodiment of the presently claimed invention, the polymeric pigment dispersant has a number average molecular weight ($M_n$) in the range of from ≥1000 g/mol to ≤25000 g/mol, determined according to gel permeation chromatography against a polystyrene standard. In a preferred embodiment of the presently claimed invention, the polymeric pigment dispersant has a number average molecular weight ($M_n$) in the range of from ≥1000 g/mol to ≤15000 g/mol.

In an embodiment of the presently claimed invention, the polymeric pigment dispersant has a polydispersity in the range of from ≥1.2 to ≤20, determined according to gel permeation chromatography against a polystyrene standard. In another embodiment of the presently claimed invention, the polymeric pigment dispersant has a polydispersity in the range of from ≥1.2 to ≤10, determined according to gel permeation chromatography against a polystyrene standard. In a preferred embodiment of the presently claimed invention, the polymeric pigment dispersant has a polydispersity in the range of from ≥1.2 to ≤3.5, determined according to gel permeation chromatography against a polystyrene standard.

In an embodiment of the presently claimed invention, the total weight of the at least one moiety of formula (I) is in the range of from ≥5 wt. % to ≤50 wt. %, based on the total weight of the polymeric pigment dispersant. In a preferred embodiment of the presently claimed invention, the total weight of the at least one moiety of formula (I) is in the range of from ≥5 wt. % to ≤30 wt. %, based on the total weight of the polymeric pigment dispersant.

Linear Di-Block Polymer

In an embodiment of the presently claimed invention, the polymer backbone (P) described hereinabove is a linear di-block polymer.

In another embodiment of the presently claimed invention, the linear di-block polymer is obtained by a living free radical polymerization.

In an embodiment of the presently claimed invention, the linear di-block polymer is obtained by a living free radical polymerization referred to as atom transfer radical polymerization (ATRP).

The ATRP process is described to provide highly uniform products having controlled structure and is also referred to as controlled radical polymerization (CRP). The ATRP process is described for preparation of copolymers which are useful in a wide variety of applications, including pigment dispersant in U.S. Pat. Nos. 6,365,666 B1 and 6,642,301 B2. The ATRP process description can be found in detail in U.S. Pat. Nos. 5,807,937 A, 5,763,548 A, 5,789,487 A and WO 1998/40415 A1.

For purposes of the presently claimed invention, the linear di-block polymer can be obtained by other polymerization techniques like reversible addition-fragmentation chain transfer (RAFT) polymerization, single electron transfer living radical polymerization (SEL-LRP), nitroxide mediated radical polymerization (NMRP), living ring opening metathesis polymerization (ROMP), living anionic and living cationic polymerization.

In a yet another embodiment of the presently claimed invention, the linear di-block polymer has a formula A-B, wherein A is a first polymer block which is obtained by reacting a first mixture comprising at least one glycidyl (meth) acrylate; and B is a second polymer block which is obtained by reacting a second mixture comprising at least one monomer selected from the group consisting of alkyl (meth) acrylate, hydroxyalkyl (meth)acrylate, polyalkylene glycol (meth)acrylate and polyethylene glycol alkyl ether (meth)acrylate.

In an embodiment of the presently claimed invention, the linear di-block polymer A-B is obtained by reacting the first polymer block A and the second polymer block B optionally in the presence of at least one solvent and optionally in the presence of at least one catalyst.

In another embodiment of the presently claimed invention, the linear di-block polymer has a formula A-B, wherein A is a first polymer block which is obtained by reacting a first mixture comprising at least one glycidyl (meth) acrylate; and B is a second polymer block which is obtained by reacting a second mixture comprising at least one monomer selected from the group consisting of alkyl (meth) acrylate, hydroxyalkyl (meth)acrylate, polyalkylene glycol (meth)acrylate and polyethylene glycol alkyl ether (meth)acrylate.

In a preferred embodiment of the presently claimed invention, the first polymer block A described hereinabove is obtained by reacting a first mixture comprising at least one glycidyl (meth)acrylate.

In a preferred embodiment of the presently claimed invention, the second polymer block B described hereinabove is obtained by reacting a second mixture comprising at least one monomer of alkyl (meth)acrylate, at least one monomer of hydroxyalkyl (meth)acrylate, at least one monomer of polyalkylene glycol (meth)acrylate and at least one monomer of polyethylene glycol alkyl ether (meth) acrylate.

In a preferred embodiment of the presently claimed invention, the second polymer block B described hereinabove is obtained by reacting a second mixture comprising at least one monomer of alkyl (meth)acrylate and at least one monomer of hydroxyalkyl (meth)acrylate.

In an embodiment of the presently claimed invention, the alkyl (meth)acrylate described hereinabove is selected from the group consisting of methyl (meth)acrylate, ethyl (meth) acrylate, propyl (meth)acrylate, isopropyl (meth)acrylate, butyl (meth)acrylate, isobutyl (meth)acrylate, hexyl (meth) acrylate, 2-ethylhexyl (meth)acrylate, nonyl (meth)acrylate, lauryl (meth)acrylate, stearyl (meth)acrylate and isodecyl (meth)acrylate. In a preferred embodiment of the presently claimed invention, the alkyl (meth)acrylate described hereinabove is selected from the group consisting of methyl (meth)acrylate, ethyl (meth)acrylate, propyl (meth)acrylate, isopropyl (meth)acrylate, butyl (meth)acrylate and isobutyl (meth)acrylate.

In an embodiment of the presently claimed invention, the hydroxyalkyl (meth)acrylate described hereinabove is selected from the group consisting of 2-hydroxyethyl (meth) acrylate, 2-hydroxypropyl (meth)acrylate and 2-hydroxybutyl (meth)acrylate.

In an embodiment of the presently claimed invention, the polyethylene glycol alkyl ether (meth)acrylate is selected from the group consisting of polyethylene glycol methylether acrylate, polyethylene glycol ethyl ether acrylate, polyethylene glycol propyl ether acrylate and polyethylene glycol butyl ether acrylate.

In an embodiment of the presently claimed invention, the linear di-block polymer has a number average molecular weight (Mn) in the range of from ≥1000 g/mol to ≤25000 g/mol, determined according to gel permeation chromatography against a polystyrene standard. In a preferred embodiment of the presently claimed invention, the polymeric pigment dispersant has a number average molecular weight (Mn) in the range of from ≥1000 g/mol to ≤15000 g/mol.

In an embodiment of the presently claimed invention, the linear di-block has a polydispersity in the range of from ≥1.2 to ≤20, determined according to gel permeation chromatography against a polystyrene standard. In an embodiment of the presently claimed invention, the linear di-block has a polydispersity in the range of from ≥1.2 to ≤10, determined according to gel permeation chromatography against a polystyrene standard. In a preferred embodiment of the presently claimed invention, the polymeric pigment dispersant has a polydispersity in the range of from ≥1.2 to ≤3.5, determined according to gel permeation chromatography against a polystyrene standard. In a most preferred embodiment of the presently claimed invention, the polymeric pigment dispersant has a polydispersity in the range of from ≥1.2 to ≤2.2, determined according to gel permeation chromatography against a polystyrene standard.

In an embodiment of the presently claimed invention, the polymer backbone (P) described hereinabove is a block polymer with at least two blocks.

Random Polymer

In an embodiment of the presently claimed invention, the polymer backbone (P) described hereinabove is a random polymer.

In a yet another embodiment of the presently claimed invention, the random polymer is obtained by a free radical polymerization.

In an embodiment of the presently claimed invention, the random polymer is obtained by free radical polymerization referred to as atom transfer radical polymerization (ATRP).

The ATRP process is described to provide highly uniform products having controlled structure and is also referred to as controlled radical polymerization (CRP). The ATRP process is described for preparation of copolymers which are useful in a wide variety of applications, including pigment dispersant in U.S. Pat. Nos. 6,365,666 B1 and 6,642,301 B2. The ATRP process description can be found in detail in U.S. Pat. Nos. 5,807,937 A, 5,763,548 A, 5,789,487 A and WO 1998/40415 A1.

For the purposes of the presently claimed invention, the random polymer can be obtained by other polymerization techniques like reversible addition-fragmentation chain transfer (RAFT), ring-opening metathesis polymerization (ROMP), and anionic and cationic polymerizations.

In an embodiment of the presently claimed invention, the random polymer is obtained by reacting a mixture (M) comprising:
(a) glycidyl (meth)acrylate and/or glycidyl acrylate;
(b) at least one monomer selected from the group consisting of alkyl (meth)acrylate, hydroxyalkyl (meth) acrylate and cycloalkyl (meth)acrylate;
(c) optionally at least one monomer of styrene; and
(d) optionally at least one monomer selected from the group consisting of vinyl monomers, monoethylenically unsaturated monomers bearing urea or keto groups and benzyl (meth)acrylate,
optionally in the presence of at least one solvent (S2).

In a preferred embodiment of the presently claimed invention, the random polymer is obtained by reacting a mixture (M) comprising:
(a) glycidyl (meth)acrylate and/or glycidyl acrylate; and
(b) at least one monomer selected from the group consisting of alkyl (meth)acrylate, hydroxyalkyl (meth) acrylate and cycloalkyl (meth)acrylate;

In a preferred embodiment of the presently claimed invention, the random polymer is obtained by reacting a mixture (M) comprising:
(a) glycidyl (meth)acrylate and/or glycidyl acrylate;
(b) at least one monomer selected from the group consisting of alkyl (meth)acrylate, hydroxyalkyl (meth) acrylate and cycloalkyl (meth)acrylate; and
(c) at least one monomer of styrene.

In an embodiment of the presently claimed invention, the random polymer is obtained by reacting a mixture (M) comprising:
(a) glycidyl (meth)acrylate and/or glycidyl acrylate;
(b) at least one monomer selected from the group consisting of alkyl (meth)acrylate, hydroxyalkyl (meth) acrylate and cycloalkyl (meth)acrylate;

(c) at least one monomer of styrene; and
(d) at least one monomer selected from the group consisting of vinyl monomers, monoethylenically unsaturated monomers bearing urea or keto groups and benzyl (meth)acrylate, In a preferred embodiment of the presently claimed invention, the random polymer is obtained by reacting a mixture (M) comprising:
(a) glycidyl (meth)acrylate and/or glycidyl acrylate;
(b) at least one monomer selected from the group consisting of alkyl (meth)acrylate, hydroxyalkyl (meth)acrylate and cycloalkyl (meth)acrylate; and
(c) at least one monomer of styrene.
in the presence of at least one solvent (S2).

In a preferred embodiment of the presently claimed invention, the random polymer is obtained by reacting a mixture (M) comprising:
(a) glycidyl (meth)acrylate and/or glycidyl acrylate; and
(b) at least one monomer selected from the group consisting of alkyl (meth)acrylate, hydroxyalkyl (meth)acrylate and cycloalkyl (meth)acrylate;
in the presence of at least one solvent (S2).

In an embodiment of the presently claimed invention, the alkyl (meth)acrylate described hereinabove is selected from the group consisting of methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, 2-ethylhexyl (meth)acrylate, nonyl (meth)acrylate, lauryl (meth)acrylate, stearyl (meth)acrylate and isodecyl (meth)acrylate). In a preferred embodiment of the presently claimed invention, the alkyl (meth)acrylate described hereinabove is selected from the group consisting of methyl (meth)acrylate, ethyl (meth)acrylate, propyl (meth)acrylate, isopropyl (meth)acrylate, butyl (meth)acrylate and isobutyl (meth)acrylate.

In an embodiment of the presently claimed invention, the hydroxyalkyl (meth)acrylate described hereinabove is selected from the group consisting of 2-hydroxyethyl (meth)acrylate, 2-hydroxypropyl (meth)acrylate and 2-hydroxybutyl (meth)acrylate.

In an embodiment of the presently claimed invention, the cycloalkyl (meth)acrylate described hereinabove is selected from the group consisting of cyclopentyl (meth)acrylate, cyclohexyl(meth)acrylate, dicyclopentadiene (meth)acrylate, dicyclopentanyl (meth)acrylate, tricyclodecanyl (meth)acrylate, isobornyl (meth)acrylate, 4-tert-butylcyclohexyl (meth)acrylate, norbornyl (meth)acrylate and bornyl (meth)acrylate.

In an embodiment of the presently claimed invention, the at least one monomer of styrene described hereinabove is selected from the group consisting of 4-methyl styrene, 3-methyl styrene, 4-tert-butyl styrene, 4-tert-butoxy styrene, 2-bromostyrene, 3-bromostyrene, 4-bromostyrene, 2-chlorostyrene, 3-chlorostyrene, 4-chlorostyrene, 4-chloro-α-methylstyrene, 2,6-dichloro styrene, 2-flurostyrene, 3-flurostyrene, 4-fluorostyrene, 2,6-difluorostyrene, 3-nitrostyrene and 4-acetoxy styrene.

In an embodiment of the presently claimed invention, the at least one vinyl monomer described hereinabove is selected from the group consisting of 3-vinyl benzoic acid, 4-vinyl benzoic acid and 4-vinylbenzyl chloride.

In an embodiment of the presently claimed invention, the monoethylenically unsaturated monomer bearing urea or keto groups described hereinabove is selected from the group consisting of 2-(2-oxo-imidazolidin-1-yl)ethyl (meth)acrylate, 2-ureido (meth)acrylate, N-[2-(2-oxooxazolidin-3-yl)ethyl] methacrylate, acetoacetoxyethyl acrylate, acetoacetoxy-propyl methacrylate, acetoacetoxybutyl methacrylate, 2-(acetoacetoxy)ethyl methacrylate, diacetoneacrylamide (DAAM), diacetonemethacrylamide, N-(beta-ureido ethyl) acrylamide and N-(beta-ureido ethyl) methacrylamide.

In an embodiment of the presently claimed invention, the solvent (S2) is selected from the group consisting of xylene, toluene, methanol, ethanol, n-propanol, isopropanol, butanol, butoxyethanol, acetone, butanone, pentanone, hexanone, methyl isobutyl ketone, ethyl acetate, butyl acetate, amyl acetate, methoxy propyl acetate, tetrahydrofuran, diethyl ether, ethylene glycol, polyethylene glycol and mixtures thereof. In a preferred embodiment of the presently claimed invention, the solvent (S2) is selected from the group consisting of toluene, n-propanol, isopropanol, methyl isobutyl ketone and mixtures thereof.

In an embodiment of the presently claimed invention, the random polymer has a number average molecular weight (Mn) in the range of from ≥1000 g/mol to ≤25000 g/mol, determined according to gel permeation chromatography against a polystyrene standard. In a preferred embodiment of the presently claimed invention, the polymeric pigment dispersant has a number average molecular weight (Mn) in the range of from ≥1000 g/mol to ≤15000 g/mol.

In an embodiment of the presently claimed invention, the random polymer has a polydispersity in the range of from ≥1.5 to ≤20, determined according to gel permeation chromatography against a polystyrene standard. In another embodiment of the presently claimed invention, the random polymer has a polydispersity in the range of from ≥1.5 to ≤10, determined according to gel permeation chromatography against a polystyrene standard. In a preferred embodiment of the presently claimed invention, the polymeric pigment dispersant has a polydispersity in the range of from ≥1.5 to ≤5, determined according to gel permeation chromatography against a polystyrene standard. In a most preferred embodiment of the presently claimed invention, the polymeric pigment dispersant has a polydispersity in the range of from ≥1.5 to ≤3, determined according to gel permeation chromatography against a polystyrene standard.

Graft Polymer

In an embodiment of the presently claimed invention, the polymeric pigment dispersant described hereinabove is a graft polymer.

In an embodiment of the presently claimed invention, the graft polymer described hereinabove and hereinbelow comprises at least one polyester block.

In a yet another embodiment of the presently claimed invention, the polyester block described hereinabove is obtained from monomeric units of a hydroxy-functional aliphatic acid or a hydroxy-functional aromatic acid or hydroxy-functional araliphatic acid. In a preferred embodiment of the presently claimed invention, the polyester block described hereinabove is obtained from monomeric units of a hydroxy-functional aliphatic acid. In an embodiment of the presently claimed invention, the hydroxy-functional aliphatic acid described hereinabove is selected from the group consisting of glycolic acid, lactic acid, 5-hydroxy valeric acid, 12-hydroxy stearic acid, 3-hydroxy-butyric acid, 4-hydroxy-valeric acid and 6-hydroxy caproic acid.

In a preferred embodiment of the presently claimed invention, the polyester block described hereinabove is obtained in the presence of a saturated fatty acid or an unsaturated fatty acid. Representative examples of saturated or the unsaturated fatty acid is selected preferably from the group consisting of oleic acid, linolenic acid, palmitoleic acid and tall oil fatty acid.

In another embodiment of the presently claimed invention, the polyester block described hereinabove is obtained from monomeric units of a lactone. In a yet another embodiment of the presently claimed invention, the lactone described hereinabove is selected from the group consisting of δ-valerolactone, ε-caprolactone, β-methyl-δ-valerolactone, 2-methyl-ε-caprolactone, 3-methyl-ε-caprolactone, 4-methyl-ε-caprolactone, 5-ter-butyl-ε-caprolactone, 7-methyl-ε-caprolactone, 4,4,6-trimethyl-ε-caprolactone and β-propiolactone.

In an embodiment of the presently claimed invention, the total weight of the at least one polyester block described hereinabove is in the range of from ≥5 wt. % to ≤95 wt. %, based on the total weight of the polymeric pigment dispersant. In a preferred embodiment of the presently claimed invention, the total weight of the at least one polyester block described hereinabove is in the range of from ≥45 wt. % to ≤80 wt. %, based on the total weight of the polymeric pigment dispersant.

In an embodiment of the presently claimed invention, the polyester block described hereinabove is bonded to the moiety of formula (I) and/or the polymer backbone (P) via a —C(=O)—O— group.

In another embodiment of the presently claimed invention, the graft polymer described hereinabove and hereinbelow comprises at least one polyether block.

In another embodiment of the presently claimed invention, the at least one polyether block described hereinabove comprises a polyoxyethylene group comprising from 10 to 120 ethylene oxide units. In a preferred embodiment of the presently claimed invention, the at least one polyether block described hereinabove comprises a polyoxyethylene group comprising from 20 to 60 ethylene oxide units.

In an embodiment of the presently claimed invention, the polyether block described hereinabove is bonded to the moiety of formula (I) and/or the polymer backbone (P) via a —C(=O)—O— group.

An aspect of the presently claimed invention is directed to a process for the preparation of at least one polymeric pigment dispersant comprising a linear di-block polymer backbone comprising at least the steps of:
reacting a di-block polymer as described hereinabove with a compound of the formula (II):

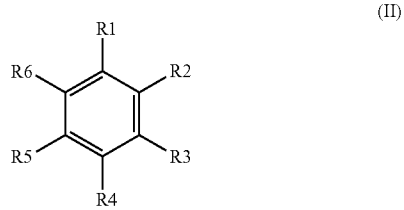

(II)

wherein
R1 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R2 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R3 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R4 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R5 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R6 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
or
R5 and R6 together with the carbon atoms to which they are bonded form an unsubstituted phenyl or substituted phenyl which is substituted with at least one —OH;
whereby the at least one phenyl in each case may be substituted further with 1, 2 or 3 substituents independently selected from the group consisting of F, Cl, Br, I, —NO$_2$, —CN, —C$_1$-C$_6$-alkyl, —CHF$_2$, —CH$_2$F, —CF$_3$, cyclopropyl, —O—C$_1$-C$_6$-alkyl, —C(=O)—C$_1$-C$_6$-alkyl, —C(=O)—O—C$_1$-C$_6$-alkyl, —C(=O)—O— phenyl and —CH$_2$—C(=O)—C$_1$-C$_6$-alkyl;
whereby at least two of R1, R2, R3, R4, R5 and R6 are —OH or comprise —OH and one of R1, R2, R3, R4, R5 and R6 is a —C(=O)—OH or comprises a —C(=O)—OH;
at a temperature in the range from ≥80° C. to ≤150° C.; and wherein the linear di-block polymer comprises a first and a second block and is obtained by a living free radical polymerization, optionally in the presence of a solvent (S3).

In an embodiment of the presently claimed invention, the solvent (S3) is selected from the group consisting of butyl acetate, methyl N-amyl ketone, methyl isobutyl ketone, butyl acetate, methyl isoamyl ketone and isopropanol.

In an embodiment, the presently claimed invention is directed to a process for the preparation of at least one polymeric pigment dispersant comprising a linear di-block polymer backbone comprising at least the steps of:
reacting a di-block polymer as described hereinabove with a compound of the formula (II):

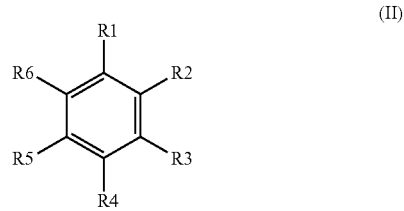

(II)

wherein
- R1 is selected from the group consisting of H, —OH, a —C(=O)—O— group, a linear or a branched, substituted C$_1$-C$_8$ alkyl and a linear or branched, substituted C$_2$-C$_8$ alkenyl, whereby the alkyl and the alkenyl are each substituted with one —C(=O)—O— group and at least one phenyl which is substituted with at least one —OH;
- R2 is selected from the group consisting of H, —OH, a —C(=O)—O— group, a linear or a branched, substituted C$_1$-C$_8$ alkyl and a linear or branched, substituted C$_2$-C$_8$ alkenyl, whereby the alkyl and the alkenyl are each substituted with one —C(=O)—O— group and at least one phenyl which is substituted with at least one —OH;
- R3 is selected from the group consisting of H, —OH, a —C(=O)—O— group, a linear or a branched, substituted C$_1$-C$_8$ alkyl and a linear or branched, substituted C$_2$-C$_8$ alkenyl, whereby the alkyl and the alkenyl are each substituted with one —C(=O)—O— group and at least one phenyl which is substituted with at least one —OH;
- R4 is selected from the group consisting of H, —OH, a —C(=O)—O— group, a linear or a branched, substituted C$_1$-C$_8$ alkyl and a linear or branched, substituted C$_2$-C$_8$ alkenyl, whereby the alkyl and the alkenyl are each substituted with one —C(=O)—O— group and at least one phenyl which is substituted with at least one —OH;
- R5 is selected from the group consisting of H, —OH, a —C(=O)—O— group, a linear or a branched, substituted C$_1$-C$_8$ alkyl and a linear or branched, substituted C$_2$-C$_8$ alkenyl, whereby the alkyl and the alkenyl are each substituted with one —C(=O)—O— group and at least one phenyl which is substituted with at least one —OH;
- R6 is selected from the group consisting of H, —OH, a —C(=O)—O— group, a linear or a branched, substituted C$_1$-C$_8$ alkyl and a linear or branched, substituted C$_2$-C$_8$ alkenyl, whereby the alkyl and the alkenyl are each substituted with one —C(=O)—O— group and at least one phenyl which is substituted with at least one —OH; or
- R5 and R6 together with the carbon atoms to which they are bonded form an unsubstituted phenyl or substituted phenyl which is substituted with at least one —OH;

whereby at least two of R1, R2, R3, R4, R5 and R6 are —OH or comprise —OH and one of R1, R2, R3, R4, R5 and R6 is a —C(=O)—O— group or comprises a —C(=O)—O— group;
at a temperature from ≥100° C. to ≤130° C.; and
wherein the linear di-block copolymer comprises a first and a second block and is obtained by a living free radical polymerization, optionally in the presence of a solvent (S3).

An aspect of the presently claimed invention is directed to a process for the preparation of at least one polymeric pigment dispersant comprising a random polymer comprising at least the steps of:

(a) reacting a random polymer as described hereinabove with a compound of the formula (II):

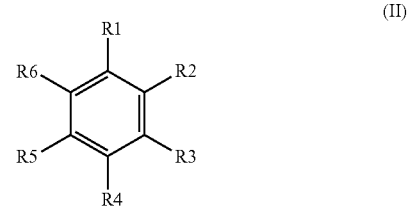

(II)

wherein
- R1 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH;
- R2 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH;
- R3 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH;
- R4 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH;
- R5 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH;
- R6 is selected from the group consisting of H, —OH, a —C(=O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(=O)—OH and at least one phenyl which is substituted with at least one —OH; or
- R5 and R6 together with the carbon atoms to which they are bonded form an unsubstituted phenyl or substituted phenyl which is substituted with at least one —OH;

whereby the at least one phenyl in each case may be substituted further with 1, 2 or 3 substituents independently selected from the group consisting of F, Cl, Br, I, —NO$_2$, —CN, —C$_1$-C$_6$-alkyl, —CHF$_2$, —CH$_2$F, —CF$_3$, cyclopropyl, —O—C$_1$-C$_6$-alkyl, —C(=O)—C$_1$-C$_6$-alkyl, —C(=O)—O—C$_1$-C$_6$-alkyl, —C(=O)—O— phenyl and —CH$_2$—C(=O)—C$_1$-C$_6$-alkyl;
whereby at least two of R1, R2, R3, R4, R5 and R6 are —OH or comprise —OH and one of R1, R2, R3, R4, R5 and R6 is a —C(=O)—OH or comprises a —C(=O)—OH; and (b) reacting the compound obtained in step (a) with at least one monomer of a lactone at a temperature from ≥30° C. to ≤190° C.

In an embodiment, the presently claimed invention is directed to a process for the preparation of at least one polymeric pigment dispersant comprising a random polymer comprising at least the steps of:
(a) reacting a random polymer as described hereinabove with a compound of the formula (II):

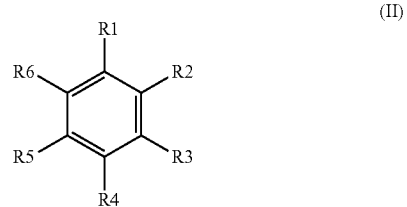

(II)

wherein
R1 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;

R2 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;

R3 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;

R4 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;

R5 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;

R6 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH; or R5 and R6 together with the carbon atoms to which they are bonded form an unsubstituted phenyl or substituted phenyl which is substituted with at least one —OH;

whereby at least two of R1, R2, R3, R4, R5 and R6 are —OH or comprise —OH and one of R1, R2, R3, R4, R5 and R6 is a —C(=O)—O— group or comprises a —C(=O)—O— group;
and
(b) reacting the compound obtained in step (a) with at least one monomer of a lactone at a temperature from ≥100° C. to ≤140° C.

In an embodiment of the presently claimed invention, the at least one monomer of a lactone described hereinabove is selected from the group consisting of δ-valerolactone, ε-caprolactone, β-methyl-δ-valerolactone, 2-methyl-ε-caprolactone, 3-methyl-ε-caprolactone, 4-methyl-ε-caprolactone, 5-ter-butyl-ε-caprolactone, 7-methyl-ε-caprolactone, 4,4,6-trimethyl-ε-caprolactone and β-propiolactone.

An aspect of the presently claimed invention is directed to a process for the preparation of at least one polymeric pigment dispersant comprising a random polymer comprising at least the steps of:
(a) reacting at least one polyalkylene glycol monoalkyl ether and at least one carboxylic acid anhydride at a temperature in the range from ≥70° C. to ≤140° C. to obtain a mixture; and
(b) reacting the mixture obtained in step (a) with a random polymer described hereinabove and a compound of the formula (II):

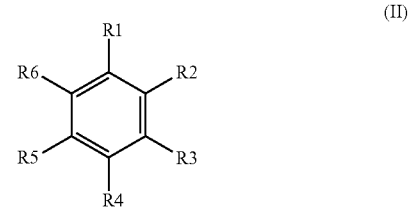

(II)

wherein
R1 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;

R2 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;

R3 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;

R4 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;

R5 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R6 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH; or
R5 and R6 together with the carbon atoms to which they are bonded form an unsubstituted phenyl or substituted phenyl which is substituted with at least one —OH;
whereby at least two of R1, R2, R3, R4, R5 and R6 are —OH or comprise —OH and one of R1, R2, R3, R4, R5 and R6 is a —C(=O)—OH or comprises a —C(=O)—OH;
whereby the at least one phenyl in each case may be substituted further with 1, 2 or 3 substituents independently selected from the group consisting of F, Cl, Br, I, —NO$_2$, —CN, —$C_1$-$C_6$-alkyl, —CHF$_2$, —CH$_2$F, —CF$_3$, cyclopropyl, —O—$C_1$-$C_6$-alkyl, —C(=O)—$C_1$-$C_6$-alkyl, —C(=O)—O—$C_1$-$C_6$-alkyl, —C(=O)—O— phenyl and —CH$_2$—C(=O)—$C_1$-$C_6$-alkyl;
at a temperature in the range from ≥70° C. to ≤140° C.

In an embodiment, the presently claimed invention is directed to a process for the preparation of at least one polymeric pigment dispersant comprising a random polymer comprising at least the steps of:

(a) reacting at least one polyalkylene glycol monoalkyl ether and at least one carboxylic acid anhydride at a temperature in the range from ≥100° C. to ≤140° C. to obtain a mixture; and (b) reacting the mixture obtained in step (a) with a random polymer described hereinabove and a compound of the formula (II):

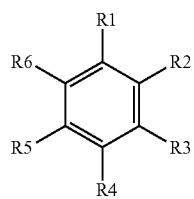

(II)

wherein
R1 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;
R2 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;
R3 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;
R4 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;
R5 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;
R6 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH; or
R5 and R6 together with the carbon atoms to which they are bonded form an unsubstituted phenyl or substituted phenyl which is substituted with at least one —OH;
whereby at least two of R1, R2, R3, R4, R5 and R6 are —OH or comprise —OH and one of R1, R2, R3, R4, R5 and R6 is a —C(=O)—O— group or comprises a —C(=O)—O— group;
at a temperature in the range from ≥100° C. to ≤140° C.

Another aspect of the presently claimed invention is directed to a pigment dispersion comprising at least one polymeric pigment dispersant according to the presently claimed invention, at least one solvent (S5) and at least one pigment.

For the purposes of the presently claimed invention, the at least one solvent (S5) is selected from the group consisting of organic solvents. Representative examples of classes of organic solvents include, but are not limited to, alcohols, ketones or ketoalcohols, ethers, esters and polyhydric alcohols. Representative examples of organic solvents include, but are not limited to, xylene, toluene, methanol, ethanol, n-propanol, isopropanol, acetone, methyl ethyl ketone, dimethyl ether, methyl ethyl ether, ethyl acetate, ethyl lactate, ethylene glycol, diethylene glycol and butyl-2-hydroxyethyl ether.

For the purposes of the presently claimed invention, the at least one pigment is a virtually insoluble, finely dispersed, organic or inorganic colourant as per the definition in the German standard specification DIN 55944.

Representative examples of organic pigments include but are not limited to, monoazo pigments, such as C.I. Pigment Brown 25; C.I. Pigment Orange 5, 13, 36 and 67; C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251; C.I. Pigment Yellow 1, 3, 73, 74, 65, 97, 151 and 183;
disazo pigments, such as C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188; anthanthrone pigments, such as C.I. Pigment Red 168 (C.I. Vat Orange 3); anthraquinone pigments, such as C.I. Pigment Yellow 147 and 177; C.I. Pigment Violet 31; anthraquinone pigments, such as C.I. Pigment Yellow 147 and 177; C.I. Pigment Violet 31;

anthrapyrimidine pigments: C.I. Pigment Yellow 108 (C.I. Vat Yellow 20); quinacridone pigments, such as C.I. Pigment Red 122, 202 and 206; C.I. Pigment Violet 19; quinophthalone pigments, such as C.I. Pigment Yellow 138; dioxazine pigments, such as C.I. Pigment Violet 23 and 37; flavanthrone pigments, such as C.I. Pigment Yellow 24 (C.I. Vat Yellow 1); indanthrone pigments, such as C.I. Pigment Blue 60 (C.I. Vat Blue 4) and 64 (C.I. Vat Blue 6); isoindoline pigments, such as C.I. Pigment Orange 69; C.I. Pigment Red 260; C.I. Pigment Yellow 139 and 185; isoindolinone pigments, such as C.I. Pigment Orange 61; C.I. Pigment Red 257 and 260; C.I. Pigment Yellow 109, 110, 173 and 185; isoviolanthrone pigments, such as C.I. Pigment Violet 31 (C.I. Vat Violet 1); metal complex pigments, such as C.I. Pigment Yellow 117, 150 and 153; C.I. Pigment Green 8; perinone pigments, such as C.I. Pigment Orange 43 (C.I. Vat Orange 7); C.I. Pigment Red 194 (C.I. Vat Red 15); perylene pigments, such as C.I. Pigment Black 31 and 32; C.I. Pigment Red 123, 149, 178, 179 (C.I. Vat Red 23), 190 (C.I. Vat Red 29) and 224; C.I. Pigment Violet 29; phthalocyanine pigments, such as C.I. Pigment Blue 15, 15:1, 15:2, 15:3, 15:4, 15:6 and 16; C.I. Pigment Green 7 and 36; pyranthrone pigments, such as C.I. Pigment Orange 51; C.I. Pigment Red 216 (C.I. Vat Orange 4); thioindigo pigments, such as C.I. Pigment Red 88 and 181 (C.I. Vat Red 1); C.I. Pigment Violet 38 (C.I. Vat Violet 3); triarylcarbonium pigments, such as C.I. Pigment Blue 1, 61 and 62; C.I. Pigment Green 1; C.I. Pigment Red 81, 81:1 and 169; C.I. Pigment Violet 1, 2, 3 and 27; C.I. Pigment Black 1 (aniline black); C.I. Pigment Yellow 101 (aldazine yellow), and C.I. Pigment Brown 22.

Representative examples of inorganic pigments include but are not limited to, white pigments such as titanium dioxide (C.I. Pigment White 6), zinc white, pigment grade zinc oxide; zinc sulfide, lithopone; lead white; furthermore white fillers such as barium sulfate and CaCO3, black pigments, such as iron oxide black (C.I. Pigment Black 11), iron manganese black, spinel black (C.I. Pigment Black 27), carbon black (C.I. Pigment Black 7); colour pigments, such as chromium oxide, chromium oxide hydrate green; chrome green (C.I. Pigment Green 48); cobalt green (C.I. Pigment Green 50); ultramarine green; cobalt blue (C.I. Pigment Blue 28 and 36); ultramarine blue, iron blue (C.I. Pigment Blue 27), manganese blue, ultramarine violet, cobalt violet, manganese violet, iron oxide read (C.I. Pigment Red 101); cadmium sulfoselenide (C.I. Pigment Red 108); molybdate read (C.I. Pigment Red 104); ultramarine read, iron oxide brown, mixed brown, spinel- and Korundum phases (C.I. Pigment Brown 24, 29 und 31), chrome orange; iron oxide yellow (C.I. Pigment Yellow 42); nickel titanium yellow (C.I. Pigment Yellow 53; C.I. Pigment Yellow 157 und 164); chrome titanium yellow; cadmium sulfide und cadmium zinc sulfide (C.I. Pigment Yellow 37 und 35); Chrome yellow (C.I. Pigment Yellow 34), zinc yellow, alkaline earth metal chromates; Naples yellow; bismuth vanadate (C.I. Pigment Yellow 184); interference pigments, such as metallic effect pigments based on coated metal platelets, pearl luster pigments based on mica platelets coated with metal oxide, and liquid crystal pigments.

For the purposes of the presently claimed invention, the at least one pigment is selected from the group consisting of metallic pigments and effect pigments. Representative examples of effect pigments include but are not limited to red pearlescent mica, white pearlescent mica, green organic mica, yellow mica, blue base mica.

For the purposes of the presently claimed invention, the at least one pigment can also comprise mixtures of two or more different pigments.

For the purposes of the presently claimed invention, the at least one pigment is preferably selected from the group consisting of BASF Perrindo Maroon L3920, BASF Perrindo Maroon L 3990, Sun Chemical Perrindo Maroon 229-8801, Sun Chemical Perrindo Maroon 229-6438, Sun Chemical Perrindo Violet 29, Clariant Hostaperm Brown HFR01, Sun Chemical Palomar Blue 248-4816, and BASF Heliogen Blue 7081 D.

In an embodiment of the presently claimed invention, the weight ratio of the polymeric pigment dispersant to the at least one pigment is in the range of from $\geq 0.1:1$ to $\leq 3:1$.

In a preferred embodiment of the presently claimed invention, the weight ratio of the polymeric pigment dispersant to the at least one pigment is in the range of from $\geq 0.25:1$ to $\leq 1.5:1$.

For the purposes of the presently claimed invention, the average particle size of the pigment particles is in the range of $\geq 10$ nanometres to $\leq 10$ microns, preferably in the range of $\geq 10$ nanometres to $\leq 5$ microns, more preferably in the range of $\geq 10$ nanometres to $\leq 1$ micron in diameter.

For the purposes of the presently claimed invention, the pigment dispersion may be prepared by methods known to those of ordinary skill in the art. Representative examples of the methods for preparing pigment dispersions include, but are not limited to, the use of energy intensive mixing or grinding using ball mills or media mills.

Another aspect of the presently claimed invention is directed to a coating composition comprising a pigment dispersion according to the presently claimed invention and at least one binder.

For the purposes of the presently claimed invention, representative examples of binders include, but are not limited to, paints, fillers, and additives. The representative examples of additives include, but are not limited to, surfactants, light stabilizers, UV-absorbers, antifoaming agents, dyes, plasticizers, levelling agents and anti-skinning agents. For the purposes of the presently claimed invention, the at least one binder is preferably selected from the group consisting of a poly(meth)acrylates, polystyrenics, polyesters, alkyds, polysaccharides and polyurethanes.

In an embodiment of the presently claimed invention, the coating composition is a solventborne composition. For the purposes of the presently claimed invention, the solventborne coating composition is a composition that comprises an organic solvent. Representative examples of organic solvents include, but are not limited to, xylene, toluene, methanol, ethanol, n-propanol, isopropanol, acetone, methyl ethyl ketone, dimethyl ether, methyl ethyl ether, ethyl acetate, ethyl lactate, ethylene glycol, diethylene glycol and butyl-2-hydroxyethyl ether.

In an embodiment of the presently claimed invention, the coating composition is a waterborne composition. For the purposes of the presently claimed invention, the waterborne coating composition is a composition that comprises water as a main solvent. However, 0 wt. % to $\leq 10$ wt. %, preferably 0 wt. % to $\leq 5$ wt. %, and most preferably 0 wt. % to $\leq 1$ wt. % of organic solvents may be present in the waterborne coating compositions.

In an embodiment of the presently claimed invention, a clearcoat material comprises the coating composition described hereinabove.

In an embodiment of the presently claimed invention, a basecoat material comprises the coating composition described hereinabove.

An aspect of the presently claimed invention is directed to a use of a pigment dispersion according to the presently claimed invention in printing ink, automotive basecoat, automotive clearcoat, mill base, furniture coatings and wood coatings.

In an embodiment of the presently claimed invention, the pigment dispersion described hereinabove is used as a clearcoat material for industrial coatings selected from the group consisting of automotive OEM finishing, the finishing of parts for installation in or on automobiles and/or utility vehicles and automotive refinish, topcoat material, and electrodepositable coating material.

Another aspect of the presently claimed invention is directed to an article coated with at least one layer formed from the coating composition according to the presently claimed invention.

For the purposes of the presently claimed invention, the coating composition can preferably be applied to the article by any of the customary application methods. Representative examples of the application methods include, but are not limited to, spraying, knife coating, spreading, pouring dipping, impregnating, trickling or rolling. With respect to such application, the substrate to be coated may itself be at rest, with the application unit or equipment being moved. Alternatively, the substrate to be coated, more particularly a coil, may be moved, with the application unit being at rest relative to the substrate or being moved appropriately. Preferable application methods are air spraying, airless spraying, high speed rotation, electrostatic spray application, alone or in conjunction with hot spray application such as hot air spraying, for example.

For the purposes of the presently claimed invention, the coating composition of the presently claimed invention can be applied to an uncoated or a precoated article.

For the purposes of the presently claimed invention, the polymeric pigment dispersant described hereinabove and hereinbelow is also referred to as polymeric dispersant or pigment dispersant or dispersant.

For the purposes of the presently claimed invention, the compound of formula (II) described hereinabove and hereinbelow is also referred to as anchoring group or anchor or anchor(s). It is an advantage of the presently claimed invention, that the pigment dispersants of the presently claimed invention provide colloidal stabilization against aggregation and/or agglomeration of the particulate or particles when functioning as a dispersant. The compound of formula (II) as described hereinabove and hereinbelow provides good interaction and strong adsorption with the pigment surface. Further, it is an advantage of the presently claimed invention that the polymeric dispersants can be prepared in a simple and efficient method that is cost effective. The process for preparation of the polymeric pigment dispersants of the presently claimed invention do not need rigorous operating conditions. The polymeric pigment dispersants of the presently claimed invention provides high chroma and transparent colour in comparison to traditional hyperdispersants or pigment dispersants.

EMBODIMENTS

In the following, there is provided a list of embodiments to further illustrate the present disclosure without intending to limit the disclosure to the specific embodiments listed below.

1. A polymeric pigment dispersant comprising a polymer backbone and at least one moiety of the formula (I):

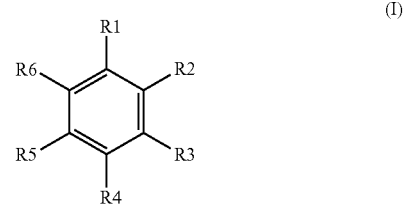

wherein
R1 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R2 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R3 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R4 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R5 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R6 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH; or R5 and R6 together with the carbon atoms to which they are bonded form an unsubstituted phenyl or substituted phenyl which is substituted with at least one —OH;

whereby the at least one phenyl in each case may be substituted further with 1, 2 or 3 substituents independently selected from the group consisting of F, Cl, Br, I, —NO$_2$, —CN, —C$_1$-C$_6$-alkyl, —CHF$_2$, —CH$_2$F, —CF$_3$, cyclopropyl, —O—C$_1$-C$_6$-alkyl, —C(=O)—C$_1$-C$_6$-alkyl, —C(=O)—O—C$_1$-C$_6$-alkyl, —C(=O)—O— phenyl and —CH$_2$—C(=O)—C$_1$-C$_6$-alkyl;

whereby at least two of R1, R2, R3, R4, R5 and R6 are —OH or comprise —OH and one of R1, R2, R3, R4, R5 and R6 is a —C(=O)—O— group or comprises a —C(=O)—O— group; and whereby the moiety of formula (I) is bonded to the polymer backbone via a —C(=O)—O— group.

2. The polymeric dispersant according to embodiment 1, wherein
R1 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;
R2 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;
R3 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;
R4 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;
R5 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH;
R6 is selected from the group consisting of H, —OH, a —C(=O)—O— group, a linear or a branched, substituted $C_1$-$C_8$ alkyl and a linear or branched, substituted $C_2$-$C_8$ alkenyl, whereby the alkyl and the alkenyl are each substituted with one —C(=O)—O— group and at least one phenyl which is substituted with at least one —OH; or
R5 and R6 together with the carbon atoms to which they are bonded form an unsubstituted phenyl or substituted phenyl which is substituted with at least one —OH;
whereby at least two of R1, R2, R3, R4, R5 and R6 are —OH or comprise —OH and one of R1, R2, R3, R4, R5 and R6 is a —C(=O)—O— group or comprises a —C(=O)—O— group; and
whereby the moiety of formula (I) is bonded to the polymer backbone via a —C(=O)—O— group.

3. The polymeric pigment dispersant according to embodiment 1, wherein the polymer backbone is a linear di-block polymer.

4. The polymeric pigment dispersant according to embodiment 3, wherein the linear diblock polymer is obtained by a living free radical polymerization.

5. The polymeric pigment dispersant according to embodiment 3, wherein the linear diblock polymer has a formula A-B, wherein
A is a first polymer block which is obtained by reacting a first mixture comprising at least one glycidyl (meth) acrylate; and
B is a second polymer block which is obtained by reacting a second mixture comprising at least one monomer selected from the group consisting of alkyl (meth) acrylate, hydroxyalkyl (meth)acrylate, polyalkylene glycol (meth)acrylate and polyethylene glycol alkyl ether (meth)acrylate.

6. The polymeric pigment dispersant according to embodiment 5, wherein the alkyl (meth)acrylate is selected from the group consisting of methyl (meth)acrylate, ethyl (meth)acrylate, propyl (meth)acrylate, isopropyl (meth) acrylate, butyl (meth)acrylate, isobutyl (meth)acrylate, hexyl (meth)acrylate, 2-ethylhexyl (meth)acrylate, nonyl (meth)acrylate, lauryl (meth)acrylate, stearyl (meth)acrylate and isodecyl (meth)acrylate.

7. The polymeric pigment dispersant according to embodiment 5, wherein the hydroxyalkyl (meth)acrylate is selected from the group consisting of 2-hydroxyethyl (meth) acrylate, 2-hydroxypropyl (meth)acrylate and 2-hydroxybutyl (meth)acrylate.

8. The polymeric pigment dispersant according to embodiment 5, wherein the polyethylene glycol alkyl ether (meth)acrylate is selected from the group consisting of polyethylene glycol methylether acrylate, polyethylene glycol ethyl ether acrylate, polyethylene glycol propyl ether acrylate and polyethylene glycol butyl ether acrylate.

9. The polymeric pigment dispersant according to embodiment 1, wherein the polymeric pigment dispersant has a number average molecular weight (Mn) in the range of from ≥1000 g/mol to ≤25000 g/mol, determined according to gel permeation chromatography against a polystyrene standard.

10. The polymeric pigment dispersant according to embodiment 1, wherein the polymeric pigment dispersant has a polydispersity in the range of from ≥1.2 to ≤20, determined according to gel permeation chromatography against a polystyrene standard.

11. The polymeric pigment dispersant according to embodiment 1, wherein the total weight of the at least one moiety of formula (I) is the range of from ≥5 wt. % to ≤50 wt. %, based on the total weight of the polymeric pigment dispersant.

12. The polymeric pigment dispersant according to embodiment 1, wherein the polymer backbone is a random polymer.

13. The polymeric pigment dispersant according to embodiment 12, wherein the random polymer is obtained by free radical polymerization.

14. The polymeric pigment dispersant according to embodiment 12, wherein the random polymer is obtained by reacting a mixture (M) comprising:
(a) glycidyl (meth)acrylate and/or glycidyl acrylate;
(b) at least one monomer selected from the group consisting of alkyl (meth)acrylate, hydroxyalkyl (meth) acrylate and cycloalkyl (meth)acrylate;
(c) optionally at least one monomer of styrene; and
(d) optionally at least one monomer selected from the group consisting of vinyl monomers, monoethylenically unsaturated monomers bearing urea or keto groups and benzyl (meth)acrylate,
optionally in the presence of at least one solvent.

15. The polymeric pigment dispersant according to embodiment 14, wherein the alkyl (meth)acrylate is selected from the group consisting of methyl (meth)acrylate, ethyl (meth)acrylate, propyl (meth)acrylate, isopropyl (meth) acrylate, butyl (meth)acrylate, isobutyl (meth)acrylate, hexyl (meth)acrylate, 2-ethylhexyl (meth)acrylate, nonyl (meth)acrylate, lauryl (meth)acrylate, stearyl (meth)acrylate and isodecyl (meth)acrylate.

16. The polymeric pigment dispersant according to embodiment 14, wherein the hydroxyalkyl (meth)acrylate is selected from the group consisting of 2-hydroxyethyl (meth) acrylate, 2-hydroxypropyl (meth)acrylate and 2-hydroxybutyl (meth)acrylate.

17. The polymeric pigment dispersant according to embodiment 14, wherein the cycloalkyl (meth)acrylate is selected from the group consisting of cyclopentyl (meth) acrylate, cyclohexyl(meth)acrylate, dicyclopentadiene (meth)acrylate, dicyclopentanyl (meth)acrylate, tricyclodecanyl (meth)acrylate, isobornyl (meth)acrylate, 4-tert-butylcyclohexyl (meth)acrylate, norbornyl (meth)acrylate and bornyl (meth)acrylate.

18. The polymeric pigment dispersant according to embodiment 14, wherein the at least one monomer of styrene is selected from the group consisting of 4-methyl styrene, 3-methyl styrene, 4-tert-butyl styrene, 4-tert-butoxy styrene, 2-bromostyrene, 3-bromostyrene, 4-bromostyrene, 2-chlorostyrene, 3-chlorostyrene, 4-chlorostyrene, 4-chloro-α-methylstyrene, 2,6-dichloro styrene, 2-flurostyrene, 3-fluorostyrene, 4-fluorostyrene, 2,6-difluorostyrene, 3-nitrostyrene and 4-acetoxy styrene.

19. The polymeric pigment dispersant according to embodiment 14, wherein the at least one vinyl monomer is selected from the group consisting of 3-vinyl benzoic acid, 4-vinyl benzoic acid and 4-vinylbenzyl chloride.

20. The polymeric pigment dispersant according to embodiment 14, wherein the monoethylenically unsaturated monomer bearing urea or keto groups is selected from the group consisting of 2-(2-oxo-imidazolidin-1-yl)ethyl (meth) acrylate, 2-ureido (meth)acrylate, N-[2-(2-oxooxazolidin-3-yl)ethyl] methacrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM), diacetonemethacrylamide, N-(beta-ureido ethyl) acrylamide and N-(beta-ureido ethyl) methacrylamide.

21. The polymeric pigment dispersant according to embodiment 14, wherein the solvent is selected from the group consisting of methanol, ethanol, n-propanol, isopropanol, butanol, butoxyethanol, acetone, butanone, pentanone, hexanone, methyl isobutyl ketone, ethyl acetate, butyl acetate, amyl acetate, methoxy propyl acetate, tetrahydrofuran, diethyl ether, ethylene glycol, polyethylene glycol and mixtures thereof.

22. The polymeric pigment dispersant according to embodiment 12, wherein the random copolymer has a number average molecular weight (Mn) in the range of from ≥1000 g/mol to ≤25000 g/mol, determined according to gel permeation chromatography against a polystyrene standard.

23. The polymeric pigment dispersant according to embodiment 12, wherein the random copolymer has a polydispersity in the range of from ≥1.5 to ≤20 determined according to gel permeation chromatography against a polystyrene standard.

24. The polymeric pigment dispersant according to embodiment 12, wherein the polymeric pigment dispersant is a graft polymer.

25. The polymeric pigment dispersant according to embodiment 24, wherein the graft polymer comprises at least one polyester block.

26. The polymeric pigment dispersant according to embodiment 25, wherein the polyester block is obtained from monomeric units of a hydroxy-functional aliphatic acid or a hydroxy-functional aromatic acid or hydroxy-functional araliphatic acid.

27. The polymeric pigment dispersant according to embodiment 25, wherein the polyester block is obtained in the presence of a saturated fatty acid or an unsaturated fatty acid.

28. The polymeric pigment dispersant according to embodiment 27, wherein the saturated or the unsaturated fatty acid is selected from the group consisting of oleic acid, linolenic acid, palmitoleic acid and tall oil fatty acid.

29. The polymeric pigment dispersant according to embodiment 26, wherein the hydroxyfunctional aliphatic acid is selected from the group consisting of glycolic acid, lactic acid, 5-hydroxy valeric acid, 3-hydroxy-butyric acid, 12-hydroxy stearic acid, 4-hydroxy-valeric acid and 6-hydroxy caproic acid.

30. The polymeric pigment dispersant according to embodiment 25, wherein the polyester block is obtained from monomeric units of a lactone.

31. The polymeric pigment dispersant according to embodiment 30, wherein the lactone is selected from the group consisting of δ-valerolactone, ε-caprolactone, β-methyl-δ-valerolactone, 2-methyl-ε-caprolactone, 3-methyl-ε-caprolactone, 4-methyl-ε-caprolactone, 5-tert-butyl-ε-caprolactone, 7-methyl-ε-caprolactone, 4,4,6-trimethyl-ε-caprolactone and β-propiolactone.

32. The polymeric pigment dispersant according to embodiment 25, wherein the total weight of the at least one polyester block is in the range of from 5 wt. % to 95 wt. %, based on the total weight of the polymeric pigment dispersant.

33. The polymeric pigment dispersant according to embodiment 25, wherein the polyester block is bonded to the moiety of formula (I) and/or the polymer backbone via —C(=O)—O— group.

34. The polymeric pigment dispersant according to embodiment 24, wherein the graft polymer comprises at least one polyether block.

35. The polymeric dispersant according to embodiment 34, wherein the at least one polyether block comprises a polyoxyethylene group comprising from 10 to 120 ethylene oxide units.

36. The polymeric pigment dispersant according to embodiment 34 or 35, wherein the polyether block is bonded to the moiety of formula (I) and/or the polymer backbone via —C(=O)—O— group.

37. A process for the preparation of at least one polymeric pigment dispersant according to embodiments 3 to 11 comprising at least the steps of:
reacting a di-block polymer with a compound of the formula (II):

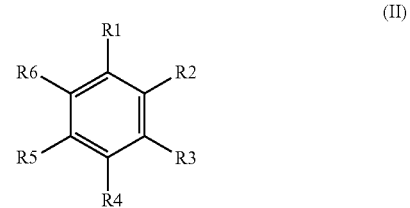

(II)

wherein
- R1 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R2 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R3 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R4 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R5 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R6 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH; or
- R5 and R6 together with the carbon atoms to which they are bonded form an unsubstituted phenyl or substituted phenyl which is substituted with at least one —OH;

whereby the at least one phenyl in each case may be substituted further with 1, 2 or 3 substituents independently selected from the group consisting of F, Cl, Br, I, —NO$_2$, —CN, —$C_1$-$C_6$-alkyl, —CHF$_2$, —CH$_2$F, —CF$_3$, cyclopropyl, —O—$C_1$-$C_6$-alkyl, —C(=O)—$C_1$-$C_6$-alkyl, —C(=O)—O—$C_1$-$C_6$-alkyl, —C(=O)—O— phenyl and —CH$_2$—C(=O)—$C_1$-$C_6$-alkyl;

whereby at least two of R1, R2, R3, R4, R5 and R6 are —OH or comprise —OH and one of R1, R2, R3, R4, R5 and R6 is a —C(=O)—OH or comprises a —C(=O)—OH;

at a temperature from ≥80° C. to ≤150° C.; and wherein the linear di-block copolymer comprises a first and a second block and is obtained by a living free radical polymerization, optionally in the presence of a solvent.

38. A process for the preparation of at least one polymeric pigment dispersant according to the embodiments 25 to 33 comprising at least the steps of:

(a) reacting a random polymer as defined in embodiments 12 to 14 with a compound of the formula (II):

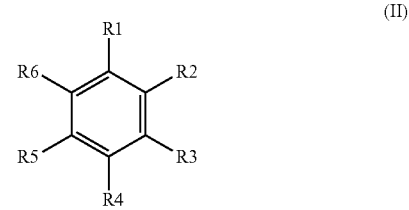

wherein
- R1 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R2 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R3 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R4 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R5 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
- R6 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH; or
- R5 and R6 together with the carbon atoms to which they are bonded form an unsubstituted phenyl or substituted phenyl which is substituted with at least one —OH;

whereby the at least one phenyl in each case may be substituted further with 1, 2 or 3 substituents independently selected from the group consisting of F, Cl, Br, I, —NO$_2$, —CN, —$C_1$-$C_6$-alkyl, —CHF$_2$, —CH$_2$F, —CF$_3$, cyclopropyl, —O—$C_1$-$C_6$-alkyl, —C(=O)—$C_1$-$C_6$-alkyl, —C(=O)—O—$C_1$-$C_6$-alkyl, —C(=O)—O— phenyl and —CH$_2$—C(=O)—$C_1$-$C_6$-alkyl;

whereby at least two of R1, R2, R3, R4, R5 and R6 are —OH or comprise —OH and one of R1, R2, R3, R4, R5 and R6 is a —C(=O)—OH or comprises a —C(=O)—OH;

and
(b) reacting the compound obtained in step (a) with at least one monomer of a lactone at a temperature from ≥30° C. to ≤190° C.

39. A process for the preparation of at least one polymeric pigment dispersant according to the embodiments 34 to 36 comprising at least the steps of:
(a) reacting at least one polyalkylene glycol monoalkyl ether and at least one carboxylic acid anhydride at a temperature in the range from ≥70° C. to ≤140° C. to obtain a mixture; and
(b) reacting the mixture obtained in step (a) with a random polymer as defined in embodiments 12 to 14 and a compound of the formula (II):

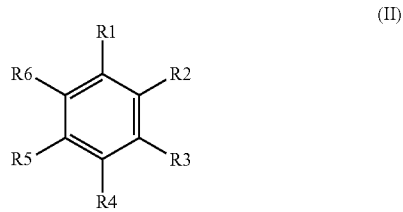

wherein
R1 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R2 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R3 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R4 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R5 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R6 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH; or
R5 and R6 together with the carbon atoms to which they are bonded form an unsubstituted phenyl or substituted phenyl which is substituted with at least one —OH;

whereby at least two of R1, R2, R3, R4, R5 and R6 are —OH or comprise —OH and one of R1, R2, R3, R4, R5 and R6 is a —C(=O)—OH or comprises a —C(=O)—OH;

whereby the at least one phenyl in each case may be substituted further with 1, 2 or 3 substituents independently selected from the group consisting of F, Cl, Br, I, —NO₂, —CN, —$C_1$-$C_6$-alkyl, —CHF₂, —CH₂F, —CF₃, cyclopropyl, —O—$C_1$-$C_6$-alkyl, —C(=O)—$C_1$-$C_6$-alkyl, —C(=O)—O—$C_1$-$C_6$-alkyl, —C(=O)—O— phenyl and —CH₂—C(=O)—$C_1$-$C_6$-alkyl;

at a temperature in the range from ≥70° C. to ≤140° C.

40. A pigment dispersion comprising at least one polymeric pigment dispersant according to any of the embodiments 1 to 36, at least one solvent and at least one pigment.

41. The pigment dispersion according to embodiment 40, wherein the weight ratio of the polymeric pigment dispersant to the at least one pigment is in the range of from ≥0.1:1 to ≤3:1.

42. A coating composition comprising a pigment dispersion according to embodiment 40 or 41 and at least one binder.

43. The coating composition according to embodiment 42, wherein the coating composition is a solventborne composition.

44. The coating composition according to embodiment 42, wherein the coating composition is a waterborne composition.

45. The use of a pigment dispersion according to embodiment 40 or 41 in printing ink, automotive clearcoat, automotive basecoat, mill base, furniture coatings and wood coatings.

46. An article coated with at least one layer formed from the coating composition according to any one of the embodiments 42 to 44.

While the presently claimed invention has been described in terms of its specific embodiments, certain modifications and equivalents will be apparent to those skilled in the art and are intended to be included within the scope of the presently claimed invention

EXAMPLES

The presently claimed invention is illustrated in detail by non-restrictive working examples which follow. More particularly, the test methods specified hereinafter are part of the general disclosure of the application and are not restricted to the specific working examples.

Anchors Used in the Preparation of the Polymeric Pigment Dispersant

Scheme 1-Structure of anchors A to F

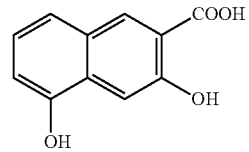

3,5-dihydroxy naphthoic acid (B)
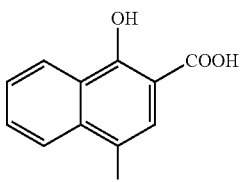
1,4-dihydroxy naphthoic acid (C)
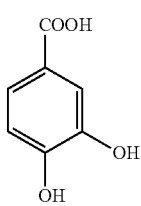
3,4-dihydroxy benzoic acid (D)
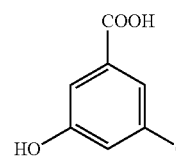
3,5-dihydroxy benzoic acid (E)
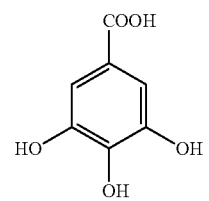
3,4,5-trihydroxy benzoic acid (F)
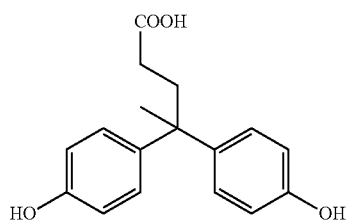

Preparation of the Di-Block Polymeric Pigment Dispersant
(I) Preparation of Solventborne Di-Block Prepolymer According to methods that are familiar to those skilled in the art, the di-block prepolymer for solventborne dispersants (prepolymer 1, prepolymer 2 and prepolymer 3) were synthesized out via controlled radical polymerization (CRP) in three major steps as described below. The raw material composition is provided in Tables 1-3. The characteristics of different backbones that are used in the synthesis of the random type of polymeric dispersants are shown in Table 4.

Step A: A 5 L four neck round bottom flask fitted with a condenser, an agitator, and a thermocouple was charged with reagents 1-4 (Tables 1-2) and purged with nitrogen for 10 minutes. This was followed by addition of reagent 5 with further purging of 20 minutes. The dark brown mixture was heated to 70° C. and held at that temperature for 1.5 h. Nitrogen purging was continued until the temperature reached to 70° C.

Step B: At the end of step A, the temperature of the reaction mixture was reduced to 60° C. and a mixture of reagents 6-9 (Tables 1-2) purged with nitrogen for 30 minutes was transferred to the reaction flask through a cannula under slight positive nitrogen pressure. The reaction temperature was increased to and held at 80° C. for 9.5 h.

Step C: At the end of step B, the reaction mixture was exposed to air. A mixture of reagents 10 and 11 (Tables 1-2) was added directly to the flask and held at 80° C. for 5 h. Towards the end of this process the green colour of the resin disappeared and the initially yellow amberlyte--748 resin turned into bluish green. The solution was filtered through a solid filtration funnel to remove amberlyte resin beads. The acetic acid and some solvent was distilled off under reduced pressure until 10% of the volatile is removed.

TABLE 1

Synthesis of prepolymer 1

| | | Raw material | Weight (g) | Mol |
|---|---|---|---|---|
| 1 | A | Butyl acetate | 1112.4000 | 9.5764 |
| 2 | | Glycidyl methacrylate | 434.5000 | 3.0565 |
| 3 | | TsCl | 57.2000 | 0.3000 |
| 4 | | Bpy | 9.4490 | 0.0605 |
| 5 | | Cu(0) | 3.8445 | 0.0605 |
| 6 | B | Butyl methacrylate | 406.1200 | 3.1686 |
| 7 | | HPMA | 568.9200 | 3.9462 |
| 8 | | n-butyl acetate | 500.0000 | |
| 9 | | Butyl acrylate | 962.5000 | 7.5096 |
| 10 | C | Acetic acid | 27.4313 | 0.4568 |
| 11 | | Amberlyte-748 | 173.2500 | | where, glycidyl methacrylate and HPMA=2-hydroxypropyl methacrylate were obtained from Dow Chemical; butyl methacrylate, TsCl=p-toluene sulfonyl chloride, acetic acid and Bpy=bipyridyl were obtained from Sigma Aldrich; butyl acrylate was obtained from BASF and Amberlyte-748 resin was obtained from Alfa Aesar.

TABLE 2

Synthesis of prepolymer 2

| | | Raw material | Weight (g) | Mol |
|---|---|---|---|---|
| 1 | A | Butyl acetate | 1100.0000 | 9.4697 |
| 2 | | Glycidyl methacrylate | 470.0000 | 3.3063 |
| 3 | | TsCl | 114.4000 | 0.6001 |
| 4 | | Bpy | 7.0868 | 0.0454 |
| 5 | | Cu(0) | 2.8834 | 0.0454 |
| 6 | B | Butyl methacrylate | 439.0000 | 3.4251 |
| 7 | | HPMA | 681.3000 | 4.7253 |
| 8 | | n-butyl acetate | 494.0000 | |
| 9 | | Butyl acrylate | 860.0000 | 6.7098 |
| 10 | C | Acetic acid | 27.4313 | 0.4568 |
| 11 | | Amberlyte-748 | 173.2500 | | where, glycidyl methacrylate and HPMA=2-hydroxypropyl methacrylate were obtained from Dow Chemical; butyl methacrylate, TsCl=p-toluene sulfonyl chloride, acetic acid and Bpy=bipyridyl were obtained from Sigma Aldrich; butyl acrylate was obtained from BASF and Amberlyte-748 resin was obtained from Alfa Aesar.

TABLE 3

Synthesis of prepolymer 3

|   |   | Raw material | Weight (g) | Mol |
|---|---|---|---|---|
| 1 | A | MIBK | 1100.0000 | 9.4697 |
| 2 |   | Glycidyl methacrylate | 470.0000 | 3.3063 |
| 3 |   | TsCl | 114.4000 | 0.6001 |
| 4 |   | Bpy | 7.0868 | 0.0454 |
| 5 |   | Cu(0) | 2.8834 | 0.0454 |
| 6 | B | PEGMEAcrylate$_{480}$ | 291.1100 | 0.6065 |
| 7 |   | HPMA | 115.6500 | 0.8021 |
| 8 |   | MIBK | 67.5000 | 0.5811 |
| 9 | C | Acetic acid | 8.1600 | 0.1359 |
| 10 |   | AMBERLITE IRC748i | 51.9700 |   |
| 11 |   | MIBK | 30.0000 | 0.2583 | where,

MIBK=methyl isobutyl ketone; glycidyl methacrylate and HPMA=2-hydroxypropyl methacrylate were obtained from Dow Chemical; TsCl=p-toluene sulfonyl chloride, acetic acid, Bpy=bipyridyl and PEGMEAcrylate480=polyethylene glycol methylether acrylate, $M_n$ 480 were obtained from Sigma Aldrich; and Amberlyte-748 resin was obtained from Alfa Aesar.

(II) Preparation of Solventborne Di-Block Polymeric Dispersants

The di-block prepolymers, prepolymer 1 and prepolymer 2 were reacted with anchors D and B (Scheme 1) at 110° C.-124° C. until the Weight per Epoxy (WPE, determined by titration with hydrogen bromide (HBr) according to ASTM D1652) reached >15,000 to result in light brown transparent solutions of dispersant 1 and dispersant 2 (Table 4) at about 50% Non-volatile (NV, determined in accordance with ASTM D2369 by removing volatile component in a forced air draft oven set at 110° C. to 60 minutes).

Using same procedure, a comparative example of di-block copolymer was prepared by reacting prepolymer 2 with an anchor 3-hydroxy-2-naphthoic acid that only has one hydroxyl group to result in dispersant 3 (Table 4).

(III) Preparation of Waterborne Di-Block Polymeric Dispersants

The di-block prepolymer, prepolymer 3 was reacted with anchors B and D (Scheme 1) to result in dispersant 4 and dispersant 5 (Table 4) respectively at 65% solid. The mixture was heated under reflux condition (115° C.) until the WPE number reached 12,000. The final product was vacuum dried to result in removal of MIBK. The resultant product was reduced in 50/50 (w/w) butyl cellosolve (source: Eastman Chemical Company) and DI water to result in brown transparent solution at about 50% non-volatile (NV).

TABLE 4

Composition of the final di-block polymeric pigment dispersant resins

| Resin # | Prepolymer # | Anchor | Solvent/s | Anchor wt. % (/solid) | Molecular weights |
|---|---|---|---|---|---|
| dispersant 1 | prepolymer 1 | D | Butyl acetate | 11 | $M_n$ = 7,452<br>$M_w$ = 12,221<br>PDI = 1.64 |
| dispersant 2 | prepolymer 2 | B | Butyl acetate | 16 | $M_n$ = 4,801<br>$M_w$ = 7,442<br>PDI = 1.55 |
| dispersant 3* | prepolymer 2 | 3-hydroxy-2-naphthoic acid | Butyl acetate | 15 | $M_n$ = 4,748<br>$M_w$ = 7,398<br>PDI = 1.56 |
| dispersant 4 | prepolymer 3 | B | Water:butyl cellosolve: 50:50 | 27 | $M_n$ = 4,138<br>$M_w$ = 5,504<br>PDI = 1.64 |
| dispersant 5 | prepolymer 3 | D | Water:butyl cellosolve: 50:50 | 13 | Mn = 4,299<br>Mw = 5,804<br>PDI = 1.35 |

*not within the scope of the invention

Preparation of the Random Polymeric Pigment Dispersant
(I) Preparation of Glycidyl Functional Polyacrylate Backbone (Acrylic Backbone BB-1 and BB-2)

The glycidyl functional acrylic copolymers for the synthesis of the random type of polymeric dispersants were synthesized by random copolymerization of glycidyl methacrylate (GMA) with other vinyl and/or (meth)acrylate monomers via conventional state of the art free radical polymerization using solution polymerization technique. The important characteristics of these polyacrylates are described in Table 5. 2,2'-Azobis(2-methylbutyronitrile) AMBN was used as thermal initiator. The characteristics of different backbones used in the synthesis of comb type of hyper-dispersants are shown in Table 5.

TABLE 5

| Acrylic backbone | Comonomers Parts by weight (PbW) respectively | Solvent/s (PbW) | % NV (110° C./1 h) | EEW (g/eq) | Molecular weight |
|---|---|---|---|---|---|
| Acrylic-BB-1 | GMA//styrene/EHA/BzMA (67.7/14.6/3.1/14.6) | MIBK | 64.46% | 229.7 | Mn = 2364<br>Mw = 4548<br>PDI = 1.92 |

TABLE 5-continued

| Acrylic backbone | Comonomers Parts by weight (PbW) respectively | Solvent/s (PbW) | % NV (110° C./1 h) | EEW (g/eq) | Molecular weight |
|---|---|---|---|---|---|
| Acrylic-BB-2 | GMA//styrene/EHA (88.5/9.4/2.1) | MIBK | 65.51% | 175.9 | Mn = 2491<br>Mw = 4599<br>PDI = 1.85 | where,

PbW=Parts by Weight

GMA=glycidyl methacrylate (source: Mitsubishi Gas Chemical Company); MMA=methyl methacrylate; UMA=ureido methacrylate (used as 25% W/W solution in MMA) (source: BASF); EHA=ethyl hexyl acrylate (source: Sigma Aldrich); BzMA=benzyl methacrylate (source: Geo Specialty Chemical Company); MIBK=methyl isobutyl ketone (source: Sigma Aldrich).

(II) Preparation of Solventborne Random Type Polymeric Pigment Dispersant (Dispersant 6)

Step-1: Synthesis of the Anchor Grafted Intermediate

According to methods familiar to those skilled in the art, the glycidyl functional acrylic copolymer (Acrylic-BB-1) (128.7 g) was reacted with the anchor F (91.5 g) in the presence of a catalytic amount of zinc acetylacetonate at 110-115° C. until almost all the epoxy groups were consumed as confirmed by FTIR spectroscopy. The reaction mass was cooled to ambient condition and diluted by adding ethyl methyl ketone (85 g) and then p-toluene sulfonyl isocyanate (21.1 g) was added while stirring.

Step-2: Grafting—from of Polyester Side Chains:

According to methods familiar to those skilled in the art, linear polyester stabilization chains are 'grafted from' the anchor grafted intermediate in above step-1 by ring opening polymerization of lactone monomers. The intermediate is gradually heated to 125° C. while distilling out the solvent present in intermediate. A mixture of ε-caprolactone (303.7 g) and δ-valerolactone (66.6 g) run into the reactor along with tin(II) 2-ethylhexanoate (1.4 g) while maintaining the temperature between 120° C.-130° C. The reaction was further continued at 125° C. until the desired conversion of lactone was achieved as confirmed by measuring % NV as compared to the theoretical anticipated values. Upon achieving the desired conversion, the mass was cooled to 75° C. and diluted by n-butyl acetate and stirred until a homogeneous solution was observed. The final % NV of the dispersant was 61.8%.

(III) Preparation of Waterborne Random Type Polymeric Pigment Dispersant (Dispersant 7)

The polyethylene glycol (Carbowax 2000 ®) (185.7 g) and 1-(2-hydroxyethyl)-2-imidazolidinone was charged to the reactor and heated to 120° C. under vacuum and maintained for 30 min. Vacuum was stopped and succinic anhydride (12.1 g) was added and reacted at 118-120° C. for 3.5 h. The glycidyl functional acrylic copolymer (Acrylic-BB-2) (99.0 g) was then added followed by the anchor F (57.9 g) in the presence of a catalytic amount of zinc acetylacetonate at 120° C.-125° C. until almost all the epoxy groups were consumed (epoxy equivalent weight>15000 g/eq). The solvent present in the system was distilled out during the process by simple distillation. While cooling the reaction mass to ambient condition the mass was diluted by adding a mixture of ethyl methyl ketone (170.7 g) and 1-propoxy-2-propanol (42.7 g) while stirring. The final % NV of the dispersant was 60.1%.

(IV) Preparation of Waterborne Random Type Polymeric Pigment Dispersant (Dispersant 8)

The polyethylene glycol (Carbowax 2000 ®) (167.2 g) was charged to the reactor and heated to 120° C. under vacuum and maintained for 30 min. Vacuum was stopped and succinic anhydride (7.9 g) was added and reacted at 118–120° C. for 3.5 h. The glycidyl functional acrylic copolymer (Acrylic-BB-2) (86.2 g) was then added followed by the anchor A (41.3 g) in the presence of a catalytic amount of zinc acetylacetonate at 120° C.-125° C. until almost all the epoxy groups are consumed (epoxy equivalent weight>15000 g/eq). The solvent present in the system was distilled out during the process by simple distillation. While cooling the reaction mass to ambient condition the mass was diluted by adding a mixture of ethyl methyl ketone (117.6 g) and 1-propoxy-2-propanol (29.4 g) while stirring. The final % NV of the dispersant was 67.7%.

TABLE 6

Composition of the final random polymeric pigment dispersant resins

| Resin # | polyacrylate backbone | Anchor | Solvent/s | Anchor wt. % (/solid) |
|---|---|---|---|---|
| Dispersant 6 | Acrylic-BB-1 | F | n-butyl acetate | 16.2 |
| Dispersant 7 | Acrylic-BB-2 | F | ethyl methyl ketone:1-propoxy-2-propanol; (80:20) | 17.9 |
| Dispersant 8 | Acrylic-BB-2 | A | ethyl methyl ketone:1-propoxy-2-propanol; (80:20) | 15.2 |

Evaluation and Observation of the Polymeric Dispersants

In order to evaluate the polymeric dispersants synthesized according to the process described hereinabove, solventborne or waterborne samples were formulated and ground using a Lau Disperser. The sample grind, colour performance and the particle size distribution were measured.

The evaluation was done with multiple high performance organic pigments for coatings that include, but are not limited to, BASF Perrindo Maroon L3920, BASF Perrindo Maroon L 39990, Sun Chemical Perrindo Maroon 229-8801, Sun Chemical Perrindo Maroon 229-6438, Sun Chemical Perrindo Violet 29, Clariant Hostaperm Brown HFR01, Sun Chemical Palomar Blue 248-4816, and BASF Heliogen Blue 7081 D. The pigments were obtained from Sun Chemical, New Jersey, USA and BASF Corporation, New Jersey, USA.

1) Formulation

For solventborne trials, 10% pigment loading with various dispersant on pigment (DoP) concentrations was explored. DoP concentrations ranged from ~30%-~300%. The samples were evaluated in normal butyl acetate (Nexeo Solutions, Warren, Michigan, USA) and Aromatic 100 (Nexeo Solutions, Warren, Michigan, USA). Table 7 shows typical formulations of synthesized dispersants with ~50% DoP.

For waterborne trials, 10% pigment loading with various dispersant on pigment (DoP) concentrations was explored. DoP concentrations ranged from ~25%-~200%. The samples were evaluated in deionized water and deionized water/solvent mixtures, where the solvent component was at least 2.5 wt. % of the total formulation. Examples of the solvent used include, but are not limited to, propylene glycol n-propyl ether (Nexeo Solutions, Warren, Michigan, USA) and propylene glycol n-butyl ether (Dowanol PNB, The Dow Chemical Company, Midland, Michigan, USA).

2) Grinding

To each formulation, 0.3 mm yttria stabilized zirconia beads (Fox Industries, Fairfield, New Jersey, USA) were added in order to grind the pigment. For solventborne and waterborne systems, the beads were ~100% of the total formulation weight, for example 100 g of formulation was added to 100 g of beads to make a total of 200 g.

The prepped sample was then placed on the Lau Disperser—Model DAS H-TP 200-K with cooling system (LAU GmbH, Hemer, Germany) and shaken with the fan on for 540 minutes or 9 hours. Upon completion of the run, the samples were filtered to remove the beads and stored in aluminium paint cans. Filtered beads were washed with solvent and reused.

Telegraph Rd. Southfield, Michigan 48033 using melinex drawdown sheets (Puetz GmbH+C0. Folien KG, Taunusstein, Germany). The perylene pigments (example: L3920, PV29) and phthalo blues (example: 248-4816, 7081D) were evaluated at 0.3% pigment to binder ratio by weight. The binder weight included only the 51% solids from the clearcoat. Pigment was added to R10CG0392D clearcoat under agitation. The Hostaperm Brown system was evaluated at a 0.24% P/B concentration. A 150 μm gap on the Byk drawdown bar was used (Byk-Chemie GmbH, Wesel, Germany) and allowed to flash for ~20 minutes. The sample was subsequently baked for 20 minutes at 270° F. Samples were made in duplicate to ensure reproducibility.

The waterborne pigment dispersions of perylene red L3920 were evaluated for colour performance in non-tinted formulation, prepared according to customer formulation guidelines, of a General Motors (GM) waterborne base coat, a commercially available 1 component base coat from BASF Corp. at 26701 Telegraph Rd. Southfield, Michigan 48033. Pigment was added to the non-tinted basecoat under agitation and the pH of the basecoat was adjusted to 8.1 using N,N-dimethylethanolamine (BASF, Geismar, Louisiana, USA) as a 20 wt. % solution in water. pH was measured using a Starter 300 pH Portable pH meter (Ohaus Corporation, Parsippany, New Jersey, USA). A 50 μm gap on the Byk drawdown bar was used (Byk-Chemie GmbH, Wesel, Germany) to generate a film on melinex drawdown sheets (Puetz GmbH+C0. Folien KG, Taunusstein, Germany) and allowed to flash for ~20 minutes. The sample was subsequently baked for 30 minutes at 270° F. Samples were made in duplicate in order to ensure reproducibility.

Once the sample cooled, the colour spectrum was measured using a Byk Mac i spectrophotometer (Byk-Chemie GmbH, Wesel, Germany). The melinex card with the tinted clearcoat drawdown was placed on top of a reflective mirror. The Byk Mac i is then placed on top of the melinex and

TABLE 7

Composition of the pigment dispersions

|  | Example 1 | Example 2 | Example 3* | Example 4 | Example 5 | Example 6 | Example 7 | Example 8 | Example 9 | Example 10 |
|---|---|---|---|---|---|---|---|---|---|---|
| dispersant 1 |  | 9.26 |  |  | 9.26 |  | 9.26 |  |  |  |
| dispersant 2 | 9.26 |  |  | 9.26 |  |  |  | 9.26 | 9.26 | 9.26 |
| dispersant 3 |  |  | 9.09 |  |  |  |  |  |  |  |
| dispersant 6 |  |  |  |  |  | 6.55 |  |  |  |  |
| L3920 (red) | 10 | 10 | 10 |  |  |  |  |  |  | 10 |
| PV29 (violet) |  |  |  | 10 | 10 | 10 |  |  |  |  |
| Brown HFR01 |  |  |  |  |  |  | 10 |  |  |  |
| 248-4816 (blue 15:1) |  |  |  |  |  |  |  | 10 |  |  |
| 7081D (blue 15:3) |  |  |  |  |  |  |  |  | 10 |  |
| n-butyl acetate | 80.74 | 80.74 | 80.91 | 80.74 | 80.74 | 83.45 | 80.74 | 80.74 | 80.74 |  |
| Aromatic 100 |  |  |  |  |  |  |  |  |  | 80.74 |
| Total | 100 | 100 | 100 | 100 | 100 | 100 | 100 | 100 | 100 | 100 |

*not within the scope of the invention

Evaluation of Stability and Colour

1) Sample Stability

After filtration, the fineness of the grind was evaluated using a Hegman gauge. Samples were considered to be passing if they showed a grind of <6 micron.

2) Colour Evaluation

The solventborne pigment dispersions were evaluated for colour performance in R10CG0392D, a commercially available 1 component clear coat from BASF Corp. at 26701 mirror and colour data measured with d65 light at 15, 25, 45, 75, and 110 degrees off specular using GM CieLab weightings. Measurements were done five times per sample and replicate drawdowns of a given sample compared.

This method is used because higher particle size pigment agglomerates result in more scattered light which increases the measured lightness values of the film. As the 110° angle has the longest film path length, it is the most sensitive to detecting increases in scattering.

Therefore, L* values (lightness) at the 110° angle were used for evaluation, whereby dispersions yielding lower values are more transparent and resemble therefore an improved distribution or stabilization or dispersion of the pigment particles.

Table 8 below provides typical L* values at the 110° angle for the formulated systems in Table 7.

3) Measurement of Particle Size

The particle size (PSD) of the dispersion was measured using a Malvern Zetasizer Nano S90 (Malvern Instruments Limited, Malvern, United Kingdom). For these measurements, a given sample from Table 7 was typically diluted ~1000× with normal butyl acetate and measured after equilibrating for ~30 minutes. As can be seen in Table 8, smaller particle sizes generally correlate to lower L* values at the 110° angle for a given pigment.

TABLE 8

| | PSD | L* at 110° | Weighted dL* at 110° |
|---|---|---|---|
| Example 1 | 110 | 6.38 | −0.86 |
| Example 2 | 118 | 6.78 | −0.49 |
| Example 3* | 132 | 7.29 | −0.31 |
| Example 4 | 82 | 5.14 | −1.81 |
| Example 5 | 85 | 5.26 | −1.63 |
| Example 6 | 92 | 5.57 | −1.14 |
| Example 7 | 201 | 7.16 | −1.43 |
| Example 8 | 122 | 3.55 | −0.63 |
| Example 9 | 162 | 6.24 | −1.71 |
| Example 10 | 111 | 6.9 | −0.6 |

*not within the scope of the invention

Discussion of Results

The solventborne and waterborne pigment dispersions of the presently claimed invention show better results than the control sample as illustrated in Table 8. The results in the Table 8 show that the examples with polymeric dispersant of the presently claimed invention exhibit better L* values than the dispersant 3 prepared using an anchor having only one hydroxyl group which is shown in Example 3. The Examples 1 and 2 with polymeric dispersants of the presently claimed invention in the presence of pigment L3920 show better results than Example 3 with dispersant 3 prepared using an anchor having only one hydroxyl group with the same pigment L3920, for both lightness at 110° angle and particle size. Within each pigment type there is good correlation between smaller particle size and decreased lightness values at 110° related to scattering and opacity.

Advantages

1) There was also significant particle size increment in the control resin with the anchor group as 3-hydroxy-2-naphthoic acid on addition of clearcoat, whereas, there was no particle shift due in the resins of the presently claimed invention. The results of the particle size indicate the potential of the polymeric dispersants of the presently claimed invention to produce submicron size.

2) The di-block polymeric pigment dispersants of the presently claimed invention provide more efficient de-agglomeration over the dispersant with the anchor molecule 3-hydroxy-2-naphthoic acid which was also prepared by the Controlled Radical Polymerization (CRP) method with di-block prepolymer. This indicates that more chromatic and transparent colour can be achieved via high energy micro milling process to result in pigment particles to less than 100 nm size range.

Test Methods

Particle Size Determination

The particle size was determined using digital light scattering technique, using the analyser Malvern Zetasizer Nano S90 (Malvern Instruments Limited, Malvern, United Kingdom).

L* Value Determination

The L* value was determined using Byk Mac i spectrophotometer (Byk-Chemie GmbH, Wesel, Germany). The colour data was measured with a D65 light source, and weighted dL* values were determined using GM CieLab weightings according to the standard DIN 6175-2.

The invention claimed is:

1. A polymeric pigment dispersant comprising a polymer backbone and at least one moiety of the formula (I):

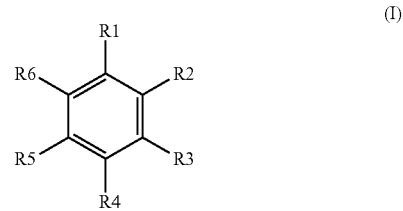

(I)

wherein

R1 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R2 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R3 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R4 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R5 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—O— group and at least one phenyl which is substituted with at least one —OH;

R6 is selected from the group consisting of H, —OH, a —C(=O)—O— group, a linear or a branched, substituted $C_1$-$C_{14}$ alkyl and a linear or branched, substituted $C_2$-$C_{14}$ alkenyl, whereby the alkyl and the alkenyl are each substituted with one —C(═O)—O— group and at least one phenyl which is substituted with at least one —OH; or R5 and R6 together with the carbon atoms to which they are bonded form an unsubstituted phenyl or substituted phenyl which is substituted with at least one —OH;

whereby the at least one phenyl in each case is optionally substituted with 1, 2 or 3 substituents independently selected from the group consisting of F, Cl, Br, I, —NO$_2$, —CN, —C$_1$-C$_6$l-alkyl, —CHF$_2$, —CH$_2$F, —CF$_3$, cyclopropyl, —O—C$_1$-C$_6$-alkyl, —C(═O)—C$_1$-C$_6$-alkyl, —C(═O)—O—C$_1$-C$_6$-alkyl, —C(═O)—O—phenyl and —CH$_2$—C(═O)—C$_1$-C$_6$-alkyl;

whereby at least two of R1, R2, R3, R4, R5 and R6 are —OH or comprise —OH and one of R1, R2, R3, R4, R5 and R6 is a —C(═O)—O— group or comprises a —C(═O)—O— group; and whereby the moiety of formula (I) is bonded to the polymer backbone via a —C(═O)—O— group;

wherein, the polymer backbone is a linear di-block polymer or a random polymer, wherein, the random polymer is obtainable by reacting a mixture (M) comprising:

(a) glycidyl (meth)acrylate and/or glycidyl acrylate; and (b) at least one monomer selected from the group consisting of alkyl (meth)acrylate, hydroxyalkyl (meth)acrylate and cycloalkyl (meth)acrylate.

2. The polymeric pigment dispersant according to claim 1, wherein the polymeric pigment dispersant has a number average molecular weight (M$_n$) in the range of from ≥1000 g/mol to ≤25000 g/mol.

3. The polymeric pigment dispersant according to claim 1,
wherein the polymeric pigment dispersant has a polydispersity (PDI) in the range of from ≥1.2 to ≤20.

4. The polymeric pigment dispersant according to claim 1,
wherein the total weight of the at least one moiety of formula (I) is in the range of from ≥5 wt. % to ≤50 wt. %, based on the total weight of the polymeric pigment dispersant.

5. The polymeric pigment dispersant according to claim 1,
wherein the polymer backbone is a random polymer, and the polymeric pigment dispersant is a graft polymer.

6. The polymeric pigment dispersant according to claim 5,
wherein the graft polymer comprises at least one polyester block or at least one polyether block.

7. A process for the preparation of at least one polymeric pigment dispersant comprising at least the steps of:

reacting a di-block polymer with a compound of the formula (II):

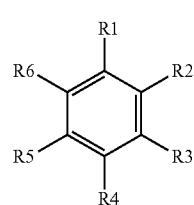

(II)

wherein

R1 is selected from the group consisting of H, —OH, a —C(═O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(═O)—OH and at least one phenyl which is substituted with at least one -OH;

R2 is selected from the group consisting of H, —OH, a —C(═O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(═O)—OH and at least one phenyl which is substituted with at least one —OH;

R3 is selected from the group consisting of H, —OH, a —C(═O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(═O)—OH and at least one phenyl which is substituted with at least one —OH;

R4 is selected from the group consisting of H, —OH, a —C(═O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(═O)—OH and at least one phenyl which is substituted with at least one —OH;

R5 is selected from the group consisting of H, —OH, a —C(═O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(═O)—OH and at least one phenyl which is substituted with at least one —OH;

R6 is selected from the group consisting of H, —OH, a —C(═O)—OH, a linear or a branched, substituted C$_1$-C$_{14}$ alkyl and a linear or branched, substituted C$_2$-C$_{14}$ alkenyl, whereby the alkyl and the alkenyl are each substituted with one —C(═O)—OH and at least one phenyl which is substituted with at least one —OH; or R5 and R6 together with the carbon atoms to which they are bonded form an unsubstituted phenyl or substituted phenyl which is substituted with at least one —OH;

whereby the at least one phenyl in each case are optionally substituted with 1, 2 or 3 substituents independently selected from the group consisting of F, Cl, Br, I, —NO$_2$, —CN, —C$_1$-C$_6$-alkyl, —CHF$_2$, —CH$_2$F, —CF$_3$, cyclopropyl, —O—C$_1$-C$_6$-alkyl, —C(═O)—C$_1$-C$_6$-alkyl, —C(═O)—O—C$_1$-C$_6$-alkyl, —C(═O)—O—phenyl and —CH$_2$—C(═O)—C$_1$-C$_6$-alkyl;

whereby at least two of R1, R2, R3, R4, R5 and R6 are —OH or comprise —OH and one of R1, R2, R3, R4, R5 and R6 is a —C(═O)—OH or comprises a —C(═O)—OH;

at a temperature from ≥80° C. to ≤150° C.; and wherein the linear di-block copolymer comprises a first and a second block and is obtained by a living free radical polymerization, optionally in the presence of a solvent.

8. A process for the preparation of at least one polymeric pigment dispersant comprising at least the steps of:

(a) reacting a random polymer with a compound of the formula (II):

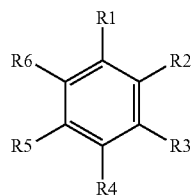

(II)

wherein
R1 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R2 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R3 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R4 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R5 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R6 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH; or
R5 and R6 together with the carbon atoms to which they are bonded form an unsubstituted phenyl or substituted phenyl which is substituted with at least one —OH;
whereby the at least one phenyl in each case are optionally substituted with 1, 2 or 3 substituents independently selected from the group consisting of F, Cl, Br, I, —NO$_2$, —CN, —C$_1$-C$_6$-alkyl, —CHF$_2$, —CH$_2$F, —CF$_3$, cyclopropyl, —O—C$_1$-C$_6$-alkyl, —C(=O)—C$_1$-C$_6$-alkyl, —C(=O)—O—C$_1$-C$_6$-alkyl, —C(=O)—O—phenyl and —CH$_2$—C(=O)—C$_1$-C$_6$-alkyl;
whereby at least two of R1, R2, R3, R4, R5 and R6 are —OH or comprise —OH and one of R1, R2, R3, R4, R5 and R6 is a —C(=O)—OH or comprises a —C(=O)—OH; and
(b) reacting the compound obtained in step (a) with at least one monomer of a lactone at a temperature from ≥30° C. to ≤190° C.

9. A process for the preparation of at least one polymeric pigment dispersant comprising at least the steps of:
(a) reacting at least one polyalkylene glycol monoalkyl ether and at least one carboxylic acid anhydride at a temperature in the range from ≥70° C. to ≤140° C. to obtain a mixture; and
(b) reacting the mixture obtained in step (a) with a random polymer and a compound of the formula (II):

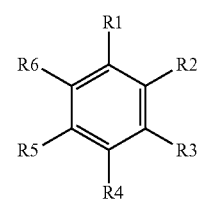

(II)

wherein
R1 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R2 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R3 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R4 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R5 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH;
R6 is selected from the group consisting of H, —OH, a —C(=O)—OH, a linear or a branched, substituted $C_1$-$C_{14}$ alkyl and a linear or branched, substituted $C_2$-$C_{14}$ alkenyl, whereby the alkyl and the alkenyl are each substituted with one —C(=O)—OH and at least one phenyl which is substituted with at least one —OH; or
R5 and R6 together with the carbon atoms to which they are bonded form an unsubstituted phenyl or substituted phenyl which is substituted with at least one —OH;
whereby at least two of R1, R2, R3, R4, R5 and R6 are —OH or comprise —OH and one of R1, R2, R3, R4, R5 and R6 is a —C(=O)—OH or comprises a —C(=O)—OH;
whereby the at least one phenyl in each case are optionally substituted with 1, 2 or 3 substituents independently selected from the group consisting of F, Cl, Br, I, —NO$_2$, —CN, —C$_1$-C$_6$-alkyl, —CHF$_2$, —CH$_2$F, —CF$_3$, cyclopropyl, —O—C$_1$-C$_6$-alkyl, —C(=O)—C$_1$-C$_6$-alkyl, —C(=O)—O—C$_1$-C$_6$-alkyl, —C(=O)—O—phenyl and —CH$_2$—C(=O)—C$_1$-C$_6$-alkyl;

at a temperature in the range from ≥70° C. to ≤140° C.

10. A pigment dispersion comprising at least one polymeric pigment dispersant according to claim 1, at least one solvent and at least one pigment.

11. A coating composition comprising the pigment dispersion according to claim 10 and at least one binder.

12. A method of using the pigment dispersion according to claim 10, the method comprising using the pigment dispersion in printing ink, automotive clearcoat, automotive basecoat, mill base, furniture coatings or wood coatings.

13. An article coated with at least one layer formed from the coating composition according to claim 11.

\* \* \* \* \*